(12) United States Patent
Brody et al.

(10) Patent No.: US 11,088,971 B2
(45) Date of Patent: Aug. 10, 2021

(54) VIRTUAL AREA COMMUNICATIONS

(71) Applicant: Sococo, Inc., Boston, MA (US)

(72) Inventors: Paul J. Brody, Palo Alto, CA (US);
David Van Wie, Eugene, OR (US);
Joseph Jennings, Larkspur, CA (US);
Joshua M. Greenbaum, Berkeley, CA (US)

(73) Assignee: Sococo, Inc., Austin, TX (US)

( * ) Notice: Subject to any disclaimer, the term of this patent is extended or adjusted under 35 U.S.C. 154(b) by 306 days.

(21) Appl. No.: 15/853,713

(22) Filed: Dec. 23, 2017

(65) Prior Publication Data

US 2018/0123987 A1 May 3, 2018

Related U.S. Application Data

(63) Continuation of application No. 13/770,761, filed on Feb. 19, 2013, now Pat. No. 9,853,922.

(60) Provisional application No. 61/603,024, filed on Feb. 24, 2012.

(51) Int. Cl.
*G06F 3/048* (2013.01)
*H04L 12/58* (2006.01)
*H04L 12/18* (2006.01)

(52) U.S. Cl.
CPC .......... *H04L 51/04* (2013.01); *H04L 12/1822* (2013.01)

(58) Field of Classification Search
CPC .... G06F 3/165; G06F 3/0481; G06F 16/2474; G06F 16/26; G06F 8/34; H04L 12/1822; H04L 51/04; H04L 65/00; H04L 65/403; H04L 65/60; G06Q 10/06; G06Q 10/0633; G06Q 10/10; G06Q 10/06316; G06Q 10/103
See application file for complete search history.

(56) References Cited

U.S. PATENT DOCUMENTS

| | | | |
|---|---|---|---|
| 5,960,173 A | 9/1999 | Tang et al. | |
| 6,271,839 B1 | 8/2001 | Mairs et al. | |
| 6,816,902 B1 * | 11/2004 | Bandat | G06Q 10/06 709/226 |
| 7,124,164 B1 | 10/2006 | Chemtob | |
| 7,240,093 B1 | 7/2007 | Danieli et al. | |
| 7,346,654 B1 * | 3/2008 | Weiss | H04N 7/15 348/E7.083 |

(Continued)

FOREIGN PATENT DOCUMENTS

WO 03015057 A1 2/2003

OTHER PUBLICATIONS

Schemeil et al.; A Workflow for Designing Virtual Worlds for Collaborative Learning; © 2010 IEEE; 8 pages.*

(Continued)

*Primary Examiner* — Linh K Pham

(57) ABSTRACT

A virtual area has a spatial visualization and includes zones that are associated with respective geometric boundaries located in relation to the spatial visualization. Realtime data stream connections between sources and sinks of network nodes in the zones of the virtual area are administered to provide a wide variety of virtual area applications, including virtual area applications that implement spatial rules for one or more synchronous conferencing services (e.g., instant messaging, such as text chat, audio conferencing, video conferencing, application sharing, and file sharing).

20 Claims, 21 Drawing Sheets

(56) References Cited

U.S. PATENT DOCUMENTS

| | | | |
|---|---|---|---|
| 7,730,030 B1* | 6/2010 | Xu | G06F 7/00 |
| | | | 707/617 |
| 7,958,453 B1* | 6/2011 | Taing | H04L 12/1827 |
| | | | 715/744 |
| 8,176,186 B2 | 5/2012 | McCanne et al. | |
| 8,199,761 B2 | 6/2012 | Barraclough et al. | |
| 8,402,085 B2 | 3/2013 | McCanne et al. | |
| 8,705,527 B1 | 4/2014 | Addepalli et al. | |
| 8,869,027 B2 | 10/2014 | Louch et al. | |
| 9,098,545 B2* | 8/2015 | Abhyanker | H04L 51/20 |
| 2004/0061773 A1 | 4/2004 | Liu | |
| 2004/0128350 A1 | 7/2004 | Topfl et al. | |
| 2005/0015293 A1* | 1/2005 | Henn | G06Q 10/06311 |
| | | | 705/7.13 |
| 2005/0149877 A1 | 7/2005 | Rice et al. | |
| 2007/0198726 A1 | 8/2007 | Marco et al. | |
| 2007/0233785 A1 | 10/2007 | Abraham et al. | |
| 2007/0291706 A1 | 12/2007 | Miller et al. | |
| 2008/0049622 A1 | 2/2008 | Previdi et al. | |
| 2008/0098121 A1 | 4/2008 | Wu | |
| 2008/0208605 A1* | 8/2008 | Sinha | G06Q 10/10 |
| | | | 705/1.1 |
| 2009/0251457 A1* | 10/2009 | Walker | G06Q 10/00 |
| | | | 345/418 |
| 2009/0254842 A1* | 10/2009 | Leacock | H04L 12/1827 |
| | | | 715/757 |
| 2009/0254843 A1* | 10/2009 | Van Wie | G06F 3/04815 |
| | | | 715/757 |
| 2009/0259718 A1* | 10/2009 | O'Sullivan | G06Q 10/10 |
| | | | 709/204 |
| 2009/0288007 A1* | 11/2009 | Leacock | G06Q 10/10 |
| | | | 715/716 |
| 2010/0246587 A1 | 9/2010 | Schutz et al. | |
| 2010/0257450 A1 | 10/2010 | Go et al. | |
| 2010/0281405 A1* | 11/2010 | Whattam | G08B 25/00 |
| | | | 715/764 |
| 2010/0299433 A1 | 11/2010 | Boer et al. | |
| 2011/0099218 A1 | 4/2011 | Schwartz | |
| 2011/0252320 A1* | 10/2011 | Arrasvuori | G06F 3/0488 |
| | | | 715/704 |
| 2012/0209933 A1 | 8/2012 | Ridges et al. | |
| 2012/0271883 A1* | 10/2012 | Montoya | H04W 4/21 |
| | | | 709/204 |
| 2012/0290950 A1* | 11/2012 | Rapaport | H04N 21/8358 |
| | | | 715/753 |
| 2013/0124712 A1 | 5/2013 | Parker | |
| 2013/0132488 A1* | 5/2013 | Bosworth | H04L 67/306 |
| | | | 709/206 |
| 2013/0227437 A1* | 8/2013 | Brody | H04L 12/1822 |
| | | | 715/757 |
| 2014/0289381 A1 | 9/2014 | Morton et al. | |
| 2014/0297811 A1 | 10/2014 | Stevens et al. | |
| 2015/0029865 A1 | 1/2015 | Drobinsky et al. | |
| 2016/0234073 A1 | 8/2016 | Maes | |
| 2017/0024259 A1 | 1/2017 | Mecklin et al. | |

OTHER PUBLICATIONS

Chris Joslin et al., Collaborative Virtual Environments—From Birth to Standardization, IEEE Communications Magazine ( vol. 42, Issue: 4, Apr. 2004.

* cited by examiner

Administer One Or More Real-time Data Stream Connections Between Network Nodes In A Virtual Area Including Zones And Having A Spatial Visualization — 410

Each Of The Network Nodes Respectively Has At Least One Of A Source And A Sink Of One Or More Data Types And Is Associated With A Respective Object In A Respective One Of The Zones Of The Virtual Area — 412

Each Of The Zones Is Associated With A Respective Geometric Boundary Located In Relation To The Spatial Visualization Of The Virtual Area — 414

Administer Connections Between Sources Of Ones Of The Network Nodes Associated With Respective Objects In A First One Of The Zones And Outside A Second One Of The Zones And Sinks Of Respective Ones Of The Network Nodes Associated With Respective Objects In The Second Zone And Outside The First Zone — 416

GZ1: Auditorium Wide
Publishes AudioChan1, ScreenChan1, ScreenChan2

> GZ2: Stage Zone
> AudioAZM: AudioChan1
> ScreenAZM: ScreenChan1, ScreenChan2

> GZ3: Q&A Zone
>> GZ4: Mic Zone
>> AudioAZM: AudioChan1
>
>> GZ5: Queuing Zone

> GZ6: General Seating Zone
> ChatAZM: ChatChan1
> Publishes ChatChan1

GZ7: West Conference Zone
AudioAZM: AudioChan2
ChatAZM: ChatChan2
ScreeAZM: ScreenChan3
Publishes: AudioChan2, ChatChan2, ScreenChan3

GZ8: East Conference Zone
AudioAZM: AudioChan3
ChatAZM: ChatChan3
ScreeAZM: ScreenChan4
Publishes: AudioChan3, ChatChan3, ScreenChan4

GZ9: Lobby Zone
AudioAZM: AudioChan4
ChatAZM: ChatChan4
Publishes: AudioChan4, ChatChan4

732 ↘
```
GZ1: Help Desk Wide
Publishes AudioChan1, ChatChan1

GZ2: Greeting Area
    AudioAZM: AudioChan1
    ChatAZM: ChatChan1

GZ3: Escalation Area
    AudioAZM: AudioChan1
    ChatAZM: ChatChan1
```

```
GZ4: Self-Guided Tour Room
AudioAZM: AudioChan2
ChatAZM: ChatChan2
ScreeAZM: ScreenChan1
Publishes: AudioChan2, ChatChan2, ScreenChan1
```

```
GZ5: Demonstration Room
AudioAZM: AudioChan3
ChatAZM: ChatChan3
ScreeAZM: ScreenChan2
Publishes: AudioChan3, ChatChan3, ScreenChan2
```

```
GZ6: Lobby
AudioAZM: AudioChan4
ChatAZM: ChatChan4
Publishes: AudioChan4, ChatChan4
```

```
GZ7: Private Office A
AudioAZM: AudioChan5
ChatAZM: ChatChan5
Publishes: AudioChan5, ChatChan5
```

```
GZ8: Private Office B
AudioAZM: AudioChan6
ChatAZM: ChatChan6
Publishes: AudioChan6, ChatChan6
```

```
GZ9: Private Office C
AudioAZM: AudioChan7
ChatAZM: ChatChan7
Publishes: AudioChan7, ChatChan7
```

FIG. 10B

VIRTUAL AREA COMMUNICATIONS

CROSS-REFERENCE TO RELATED APPLICATIONS

This application is a continuation of U.S. patent application Ser. No. 13/770,761, filed Feb. 19, 2013, which claims the benefit of U.S. Provisional Patent Application No. 61/603,024, filed Feb. 24, 2012, the entireties of both of which are incorporated herein by reference.

This application relates to the following co-pending patent applications, the entirety of each of which is incorporated herein by reference:

U.S. patent application Ser. No. 12/818,517, filed Jun. 18, 2010;
U.S. patent application Ser. No. 12/855,210, filed Aug. 12, 2010;
U.S. patent application Ser. No. 12/630,973, filed Dec. 4, 2009;
U.S. patent application Ser. No. 12/418,243, filed Apr. 3, 2009;
U.S. patent application Ser. No. 12/354,709, filed Jan. 15, 2009;
U.S. patent application Ser. No. 12/825,512, filed Jun. 29, 2010;
U.S. patent application Ser. No. 12/630,973, filed Dec. 4, 2009;
U.S. patent application Ser. No. 12/509,658, filed Jul. 27, 2009;
U.S. patent application Ser. No. 13/165,729, filed Jun. 21, 2011;
U.S. patent application Ser. No. 13/209,812, filed Aug. 15, 2011;
U.S. Provisional Patent Application No. 61/563,088, filed Nov. 23, 2011;
U.S. Provisional Patent Application No. 61/535,910, filed Sep. 16, 2011;
U.S. Provisional Patent Application No. 61/373,914, filed Aug. 16, 2010; and
U.S. Provisional Patent Application No. 61/444,989, filed Feb. 21, 2011.

BACKGROUND

When face-to-face communications are not practical, people often rely on one or more technological solutions to meet their communications needs. Traditional telephony systems enable voice communications between callers. Instant messaging (also referred to as "chat") communications systems enable users to communicate text messages in real time through instant message computer clients that are interconnected by an instant message server. Some instant messaging systems and interactive virtual reality communications systems allow users to be represented by user-controllable graphical objects (referred to as "avatars"). What are needed are improved systems and methods for realtime network communications.

DESCRIPTION OF DRAWINGS

FIG. 6 is a flow diagram of an example of a method of administering a virtual area.

FIG. 9B is a diagrammatic view of an example of a zone map for the virtual area of FIG. 9A.

FIG. 10B is a diagrammatic view of an example of a zone map for the virtual area of FIG. 10A.

DETAILED DESCRIPTION

Figure 1:
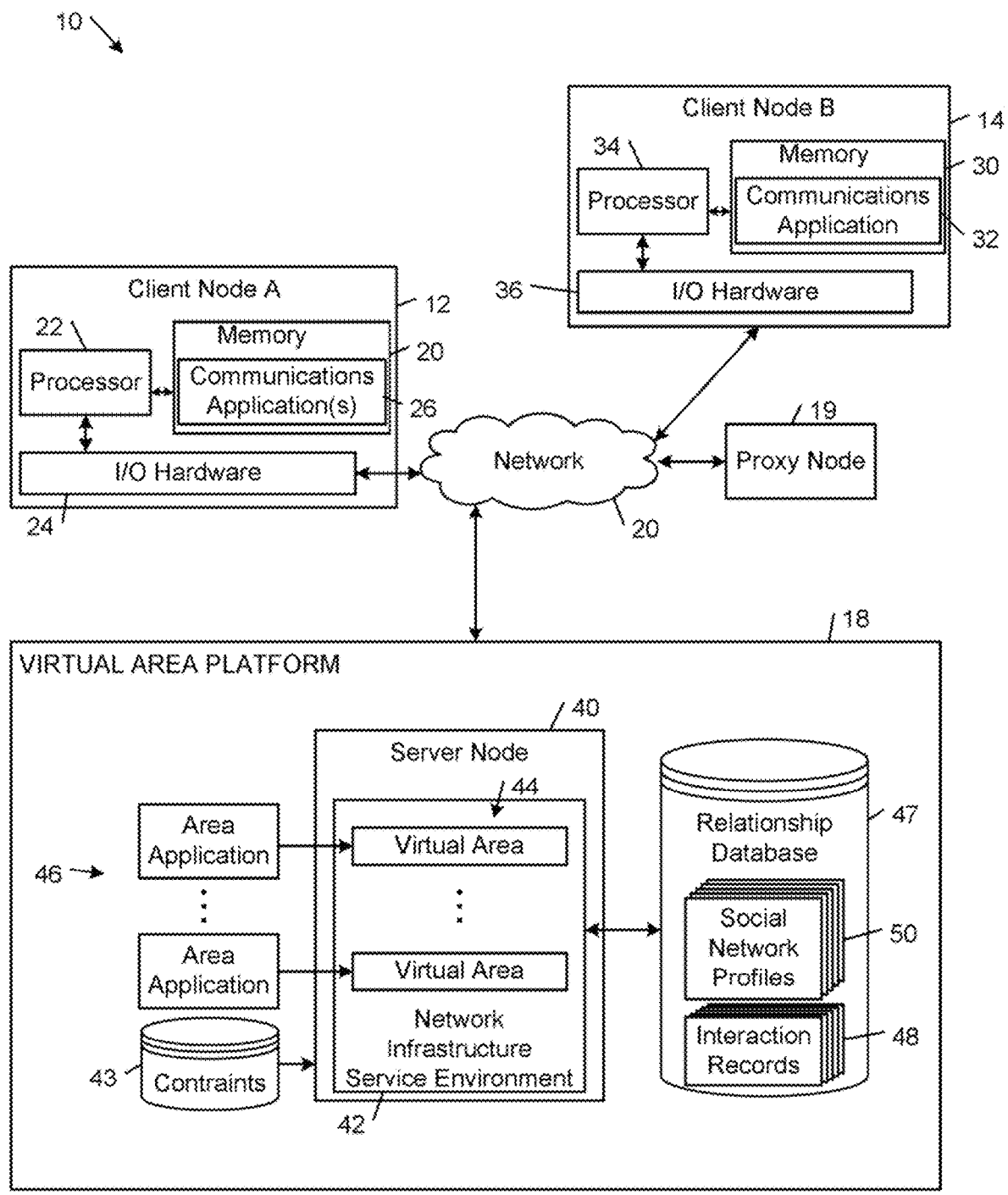
FIG. 1 is a diagrammatic view of an example of a network communications environment.

In the following description, like reference numbers are used to identify like elements. Furthermore, the drawings are intended to illustrate major features of examples in a diagrammatic manner. The drawings are not intended to depict every feature of actual examples nor relative dimensions of the depicted elements, and are not drawn to scale.

I. Definition of Terms

A "communicant" is a person who communicates or otherwise interacts with other persons over one or more network connections, where the communication or interaction may or may not occur in the context of a virtual area. A "user" is a communicant who is operating a particular network node that defines a particular perspective for descriptive purposes.

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" refers to any tangible, non-transitory medium capable storing information (e.g., instructions and data) that is readable by a machine (e.g., a computer). Storage devices suitable for tangibly embodying such information include, but are not limited to, all forms of physical, non-transitory computer-readable memory, including, for example, semiconductor memory devices, such as random access memory (RAM), EPROM, EEPROM, and Flash memory devices, magnetic disks such as internal hard disks and removable hard disks, magneto-optical disks, DVD-ROM/RAM, and CD-ROM/RAM.

A "data sink" (referred to herein simply as a "sink") is any of a device (e.g., a computer), part of a device, or software that receives data.

A "data source" (referred to herein simply as a "source") is any of a device (e.g., a computer), part of a device, or software that originates data.

A "network node" (also referred to simply as a "node") is a junction or connection point in a communications network. Examples of network nodes include, but are not limited to, a terminal, a computer, and a network switch. A "server" network node is a host computer on a network that responds to requests for information or service. A "client network node" is a computer on a network that requests information or service from a server.

A Uniform Resource Identifier (URI) is a string of characters that identifies a network resource.

A "network resource" is anything that can be identified by a uniform resource identifier (URI) and accessed over a network, including an electronic document, an image, a source of information, a service, operators and operands of a mathematical equation, classes, properties, numeric values, and a collection of other resources.

A "network connection" is a link between two communicating network nodes. A "connection handle" is a pointer or identifier (e.g., a uniform resource identifier (URI)) that can be used to establish a network connection with a network resource. A "network communication" can include any type of information (e.g., text, voice, audio, video, electronic mail message, data file, motion data stream, and data packet) that is transmitted or otherwise conveyed from one network node to another network node over a network connection.

A "communicant interaction" is any type of direct or indirect action or influence between a communicant and another network entity, which may include for example another communicant, a virtual area, or a network service. Examples of types of communicant interactions include communicants communicating with each other in realtime, a communicant entering a virtual area, and a communicant requesting access to a resource from a network service.

"Presence" refers to the ability and willingness of a networked entity (e.g., a communicant, service, or device) to communicate, where such willingness affects the ability to detect and obtain information about the state of the entity on a network and the ability to connect to the entity.

A "realtime data stream" is data that is structured and processed in a continuous flow and is designed to be received with no delay or only imperceptible delay. Realtime data streams include digital representations of voice, video, user movements, facial expressions and other physical phenomena, as well as data within the computing environment that may benefit from rapid transmission, rapid execution, or both rapid transmission and rapid execution, including for example, avatar movement instructions, text chat, realtime data feeds (e.g., sensor data, machine control instructions, transaction streams and stock quote information feeds), screen shares, and file transfers.

A "virtual area" (also referred to as an "area," a "place," or a "space") is a representation of a computer-managed space or scene. Virtual areas typically are one-dimensional, two-dimensional, or three-dimensional representations; although in some examples a virtual area may correspond to a single point. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization. A virtual area typically refers to an instance of a virtual area schema, where the schema defines the structure and contents of a virtual area in terms of variables and the instance defines the structure and contents of a virtual area in terms of values that have been resolved from a particular context.

A "position" in a virtual area refers to a location of a point or an area or a volume in the virtual area. A point typically is represented by a single set of one-dimensional, two-dimensional, or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

As used herein, the term "includes" means includes but not limited to, the term "including" means including but not limited to. The term "based on" means based at least in part on.

II. Virtual Area Designs

The embodiments that are described herein provide systems and methods for creating and administering network node communications in virtual areas that support a wide variety of different communication needs.

FIG. 1 shows an example of a network communications environment 10 that includes a first client network node 12 (Client Node A), a second client network node 14 (Client Network Node B), a virtual area platform 18 and an optional proxy node 19 that are interconnected by a network 20. The network 20 may include one or more of any of a local area network (LAN), a metropolitan area network (MAN), and a wide area network (WAN) (e.g., the internet). The network 20 typically includes a number of different computing platforms and transport facilities that support the transmission of a wide variety of different media types (e.g., text, voice, audio, video, and other data) between network nodes.

The first client network node 12 includes a computer-readable medium 22 (or "memory"), a processor 24, and input/output (I/O) hardware 26 (including a display). The processor 24 executes at least one virtual area communications application 26 that is stored in the memory 22. The second client network node 14 typically is configured in substantially the same general way as the first client network node 12, with a computer-readable medium 30 storing at least one virtual area communications application 32, a processor 34, and input/output (I/O) hardware 36 (including a display).

Each of the network nodes 12, 14 has a respective set of one or more sources and an exemplary set of one or more sinks. Each source is a device or component that originates data of a particular data stream content type and each sink is a device or component that receives data of a particular data stream content type. A source and a sink of the same data stream content type are referred to herein as being "complementary." Exemplary sources include an audio source (e.g., an audio capture device, such as a microphone), a video source (e.g., a video capture device, such as a video camera), a chat source (e.g., a text capture device, such as a keyboard), a motion data source (e.g., a pointing device, such as a computer mouse), and other sources (e.g., file sharing source or a source of a customized real-time data stream). Exemplary sinks include an audio sink (e.g., an audio rendering device, such as a speaker or headphones), a video sink (e.g., a video rendering device, such as a display monitor), a chat sink (e.g., a text rendering device, such as a display monitor), a motion data sink (e.g., a movement rendering device, such as a display monitor), and other sinks (e.g., a printer for printing shared files, a device for rendering real-time data streams different from those already described, or software that processes real-time streams for analysis or customized display). Each source has an active state in which the source is available for originating data and an inactive state in which the source is not available for originating data. Likewise, each sink has an active state in which the sink is available for receiving data and an inactive state in which the sink is not available for receiving data. The communicants operating the client nodes 12, 14 typically can control the states of the sources and sinks using controls provided by the communications applications 26, 32. For example, in some examples, the communications applications 26, 32 provide user controls for turning on/off the local microphones and the local speakers (e.g., headsets) on the client network nodes 12, 14.

The virtual area platform 18 includes at least one server network node 40 that provides a network infrastructure service environment 42 that manages sessions of the first and second client nodes 12, 14 in one or more virtual areas 44 in accordance with respective virtual area applications 46. One or more of the virtual area applications 44 typically are synchronous conferencing applications that support one or more types of communications between the client nodes 12, 14 (e.g., text chat, audio conferencing, video conferencing, application sharing, and file sharing). The network infrastructure service environment 42 typically includes one or more network infrastructure services that cooperate with the communications applications 26, 32 in the process of establishing and administering network connections between the client nodes 12, 14 and other network nodes. Among the network infrastructure services that are included in the example of the network infrastructure service environment 42 are an account service, a security service, an area service, a rendezvous service, an interaction service, and a capabilities engine. The area service administers a virtual area 44 by managing sessions of the first and second client nodes 12, 14 in the virtual area 44 in accordance with the virtual area application 46. Examples of the virtual area platform 18 and the virtual area applications 46 are described in U.S. Provisional Patent Application No. 61/563,088, filed Nov. 23, 2011. Examples of an account service, a security service, an area service, a rendezvous service, and an interaction service are described in U.S. patent application Ser. No. 12/630,973, filed Dec. 4, 2009. Examples of a capabilities engine are described in U.S. Provisional Patent Application No. 61/535,910, filed Sep. 16, 2011.

The network infrastructure service environment 42 maintains a relationship database 47 that contains the records 48 of interactions between communicants and social network profiles 50 that are associated with respective communicants. Each interaction record describes the context of an interaction between a pair of communicants. In some examples, an interaction record contains one or more of an identifier for each of the communicants, an identifier for the place of interaction (e.g., a virtual area instance), a description of the hierarchy of the interaction place (e.g., a description of how the interaction room relates to a larger area), start and end times of the interaction, and a list of all files and other data streams that are shared or recorded during the interaction. In some examples, each interaction is tracked independently such that, for a given pair of communicants, there is a list of relationship event records, each of which records a single respective interaction (e.g., sent a chat message, streamed audio for ninety-three seconds, shared file X, etc.). Thus, for each realtime interaction, the network infrastructure service environment 42 tracks when it occurred, where it occurred, and what happened during the interaction in terms of communicants involved (e.g., entering and exiting), objects that are activated/deactivated, and the files that were shared. Each social network profile 50 typically includes: identity characteristics (e.g., name, age, gender, and geographic location information such as postal mailing address) that describe a respective communicant or a persona that is assumed by the communicant; explicit relationship information that is declared by the communicant; and relationship information that is inferred from the communicant's interactions in the network communication environment 10. Additional details regarding the relationship database 47 and the search and retrieval functionalities associated with the relationship database as described in U.S. patent application Ser. No. 12/418,243, filed Apr. 3, 2009, and Ser. No. 12/354,709, filed Jan. 15, 2009.

The communications applications 26, 32, the area applications 46, and the network infrastructure service environment 42 together provide a platform that administers the realtime connections with network nodes in an instance of a virtual area subject to a set of constraints 43 (e.g., capabilities and other types of permissions, rules, and preferences). Each of the virtual area applications 46 is hosted by a respective one of the virtual areas 44 and includes a description of the respective virtual area 44. Communicants respectively operating the client nodes 12, 14 connect to the virtual areas 44 through the virtual area communications applications 26, 32.

The communications applications 26, 32 typically present respective views of the virtual areas 44 in accordance with data received from the network infrastructure service environment 42. The communications applications 26, 32 also provide respective interfaces for receiving commands from the communicants and providing an interface that enhances the realtime communications between the communicants. The communicants typically are represented in the virtual areas 44 by respective avatars (e.g., sprites), which typically move about the virtual areas 44 in response to commands that are input by the communicants at their respective network nodes. In some examples, the communications applications 26, 32 establish realtime data stream connections between the first and second client network nodes 12, 14 and other network nodes connected to the virtual area 44 based on the positions of the communicants' avatars in the virtual areas 44. In some examples, each of the client network nodes 12, 14 includes a respective realtime kernel of the type described in U.S. patent application Ser. No. 12/630,973, filed Dec. 4, 2009, which supports remote configuration of stream handlers for processing data streams (e.g., rendering audio and video data streams) on a client network node.

In some examples, the server node 40 communicates with the client nodes 12, 14 and the proxy node 19 in accordance with the stream transport protocol described in U.S. patent application Ser. No. 12/825,512, filed Jun. 29, 2010, and U.S. patent application Ser. No. 12/630,973, filed Dec. 4, 2009. The stream transport protocol supports remote management of client communication sessions and remote configuration and execution of audio and graphic rendering engines, as well as switching of data streams in response to instructions (also referred to as definitions) that are received from a remotely hosted virtual area application. The stream transport protocol is efficient in connection and disconnection, as well as in transport. In some examples, the stream transport protocol provides a connection-oriented, encrypted connection over a transport protocol (e.g., UDP, TCP, HTTP, and PPP). The stream transport protocol additionally provides between a client application and the transport layer a reconnection mechanism that automatically attempts to reestablish failed connections without intervention by the client application, thereby adding reliability on top of an inherently unreliable communication protocol.

Figure 2A:
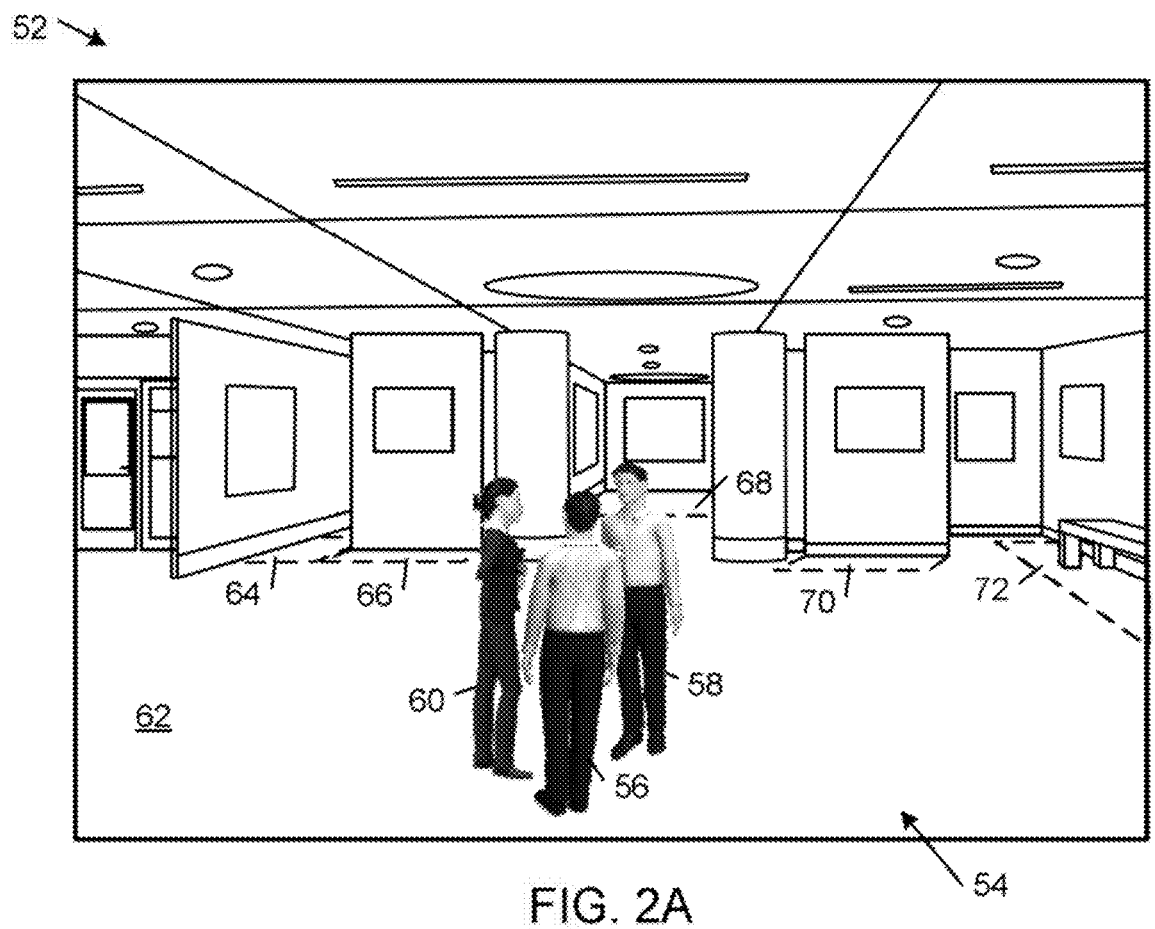
FIG. 2A is a diagrammatic view of an example of a graphical user interface showing a perspective view of a virtual area.

FIG. 2A shows an example of a graphical user interface 52 that presents a two-dimensional view of a visual virtual art gallery area 54. Communicants are represented in the virtual area 54 by respective avatars 56, 58, 60, each of which may have a respective role (e.g., a curator, an artist, and a visitor) in the virtual area 66. The virtual area 54 includes zones 62, 64, 66, 68, 70, 72. (During a typical communication session, the dashed lines demarcating the zones 62-72 in FIG. 2A are not visible to the communicants although there may be visual cues associated with such zone boundaries.) In some examples, each of the zones 62-72 has a respective zone boundary that is associated with a respective <zone_mesh> tag that has a number of attributes (e.g. <zone>, <stream> and <sink> tags) in accordance with the COLLADA Streams Reference specification described in U.S. Pat. Nos. 7,769,806 and 7,844,724. In other examples, zones are associated with one or more respective control channels on which data streams of respective data types are sourced from the zones and/or control channels that are published in the zones and can be subscribed to by network nodes in the zones.

Figure 2B:
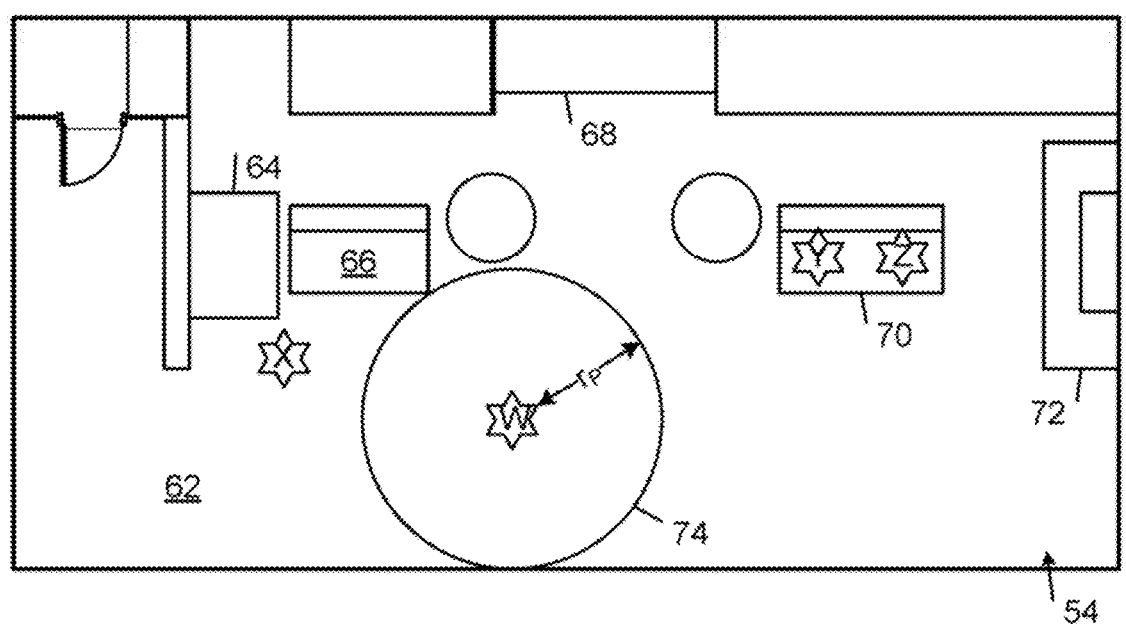
FIG. 2B is a diagrammatic plan-view of the virtual area shown in FIG. 2A that is populated with four avatar objects.

FIG. 2B shows a plan view of the virtual art gallery area 54 at a time when it is populated with four avatars W, X, Y, and, Z. The avatars W and X are positioned in the zone 62 and the avatars Y and Z are positioned in the zone 70. For the purpose of this illustrative example:

each of the avatars W-Z is associated with voice, video, and chat source types and sink types;
 the switching rules for zone 62 specify that
  each voice source that is associated with an avatar within the zone 62 is to be connected to every voice sink within the zone 62,
  each video source that is associated with an avatar within the zone 62 is to be connected to every video sink within the zone 62, and
  each chat source that is associated with an avatar within the zone 62 is to be connected to every chat sink within the zone 62;
 the switching rules for zone 70 specifies only that that each voice source that is associated with an avatar within the zone 70 is to be connected to every voice sink within the zone 70; and
 the server node executes a message handling service for the virtual area 54 that implements, on top of the zone switching rules, a proximity policy rule that only allows connections of sources with compatible sinks that are associated with respective objects that are within a prescribed distance (or radius), $r_P$, of each other in the virtual area.

In this example, the switching rules and the proximity policy rule provide respective switching conditions that determine how the connections between the avatars W, X, Y, and Z are established.

In operation, the message handling service for the virtual area 54 sends instructions for the area client node that is associated with avatar W to connect to the real-time voice, video, and chat streams that are sourced from the area client node that is associated with avatar X whenever avatar X is positioned within a proximity zone 74, which defined by the prescribed distance $r_P$, around avatar W. Likewise, the message handling service sends instructions for the area client node that is associated with avatar X to connect to the real-time voice, video, and chat streams that are sourced from the area client node that is associated with avatar W whenever avatar W is positioned within the prescribed distance $r_P$ of avatar X. Since avatar X currently is outside the proximity zone 74 of avatar A, and vice versa, the nodes associated with avatars W and X are not connected to each other in the current state shown in FIG. 2B.

Since the zone 70 only allows voice connections, the message handling service sends instructions for the area client node that is associated with avatar Y to connect to only the real-time voice stream that is sourced from the area client node that is associated with avatar Z (assuming the proximity condition specified in the proximity policy rule is satisfied). Similarly, the message handling service sends instructions for the area client node that is associated with avatar Z to connect to only the real-time voice stream that is sourced from the area client node that is associated with avatar Y (assuming the proximity condition specified in the proximity policy rule is satisfied).

Since the switching rules for zones 62 and 70 do not allow connections between zones 62 and 70, the sources and sinks that are associated with avatars W and X are not connected to any of the sources and sinks that are associated with avatars Y and Z, even if the proximity condition specified in the proximity policy rule is satisfied.

In some examples, a non-rendered governance zone typically encompasses a collection of one or more rendered location zones. One or more control channels are defined within a governance zone. A governance zone functions as a "sink" for data sent on the associated control channel, whereas a location zone that specifies the same control channel functions as the "source" of the control channel data. A user who is present in any one of the location zones within a governance zone is also present within the governance zone.

A control channel is a collection of channels that share a common definition that is managed by exactly one area/zone manager, which is a component of the area service (examples of area/zone managers are described in U.S. Provisional Patent Application No. 61/563,088, filed Nov. 23, 2011). A control channel is published by its corresponding zone manager when a communicant enters a zone that the zone manager has responsibility for. For example, a chat control channel describes the chat channels that exist (i.e., the channels that contain the chat data). When a communicant enters a room, the chat control channel publishes the chat channels that are available for the room, the communicant's client communicants application subscribed to a particular chat channel and the chat history was sent down to the client communications application on that channel. A single area/zone manager can manage multiple control channels. When a message is passed from a message handler to a zone manager, the message handler sends the zone manager the ID of the control channel on which the message came on so that the zone manager operate in the correct context defined by the control channel ID.

Figure 3:
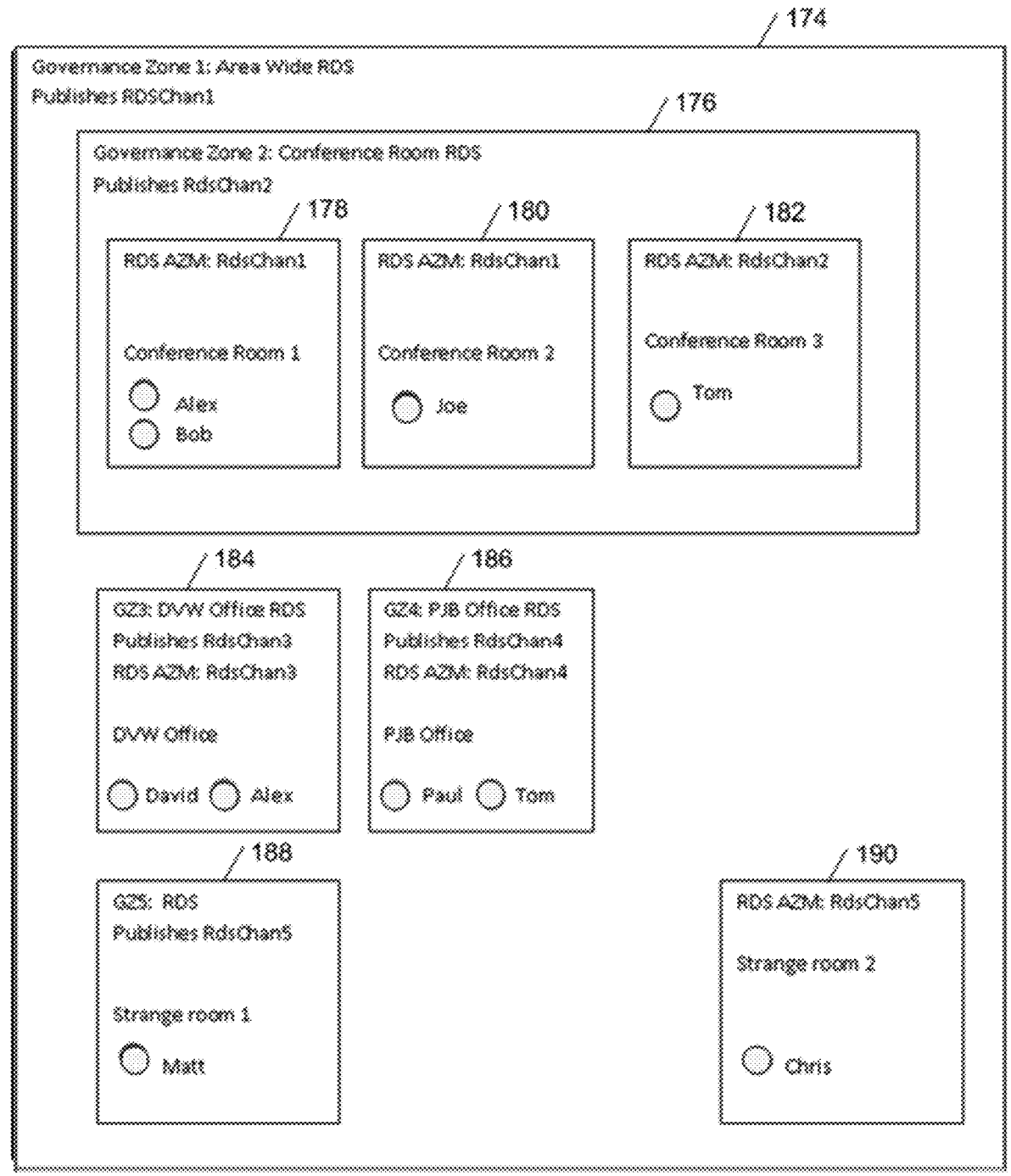
FIG. 3 is a diagrammatic plan view of an example of a zone map.

FIG. 3 shows an example of a realtime data stream (RDS) zone map that defines how RDS streams are sourced and sunk in a virtual area. The virtual area specification may include analogous zone maps for other channels that are defined for the virtual area. Some control channels, such as the session control channel and the area definition channel, only have a single instance. The virtual area includes seven location zones: Conference Room 1, Conference Room 2, Conference Room 3, DVW Office, PJB Office, Strange Room 1, and Strange Room 2. The virtual area also includes five governance zones: a global area wide zone 174, a zone 176 containing all three conference rooms, zones 178, 180, 182, 184, 186 for each office (which coincide with the location zones), and zones 188, 190 for Strange Room 1 and Strange Room 2.

Alex is present in Conference Room 1, GZ1, GZ2 and DVW Office (GZ3), Bob is present in Conference Room 1, GZ1 and GZ2, Joe is present in Conference Room 2, GZ1 and GZ2, Tom is present in Conference Room 2, GZ1, GZ2 and PJB Office/GZ4, David is present in DVW Office/GZ3 and GZ1, Paul is present in PJB Office/GZ4 and GZ1, Matt is present in Strange Room 1/GZ5 and GZ1, and Chris is present in Strange Room 2 and GZ1.

There are five control channels for RDS, one published by each zone except zone 190, which does not publish any RDS data: RDSChan1 is published by zone 174; RdsChan2 is published by zone 176; RdsChan3 is published by zone 184; RdsChan4 is published by zone 186; and RdsChan5 is published by zone 188. RDS activity in a zone is sent out on all RDS zone manager control channels for that zone and delivered to all users present in the governance zones that publish those control channels.

Activity in any of conference room 1 or conference room 2 is published on RdsChan1, which is published by an area/zone manager for governance zone 174. Since every user in the area is in governance zone 174, all users in the area are subscribed to RdsChan1 and see the RDS activity in Conference Rooms 1 and 2 (governance zones 178, 180). An area/zone manager for governance zone 182 publishes activity in Conference Room 3 (governance zone 182) on RdsChan2. In this case, only Alex, Bob, Joe and Tom are in governance zone 176, so only they are subscribed to the channel and see Tom's Activity in Conference Room 3. Since RdsChan1 is not a control channel for Conference Room 3, activity in Conference Room 3 is not broadcasted on that channel. Activity in the DVW Office is sent out on RdsChan3, which is published by governance zone 184 and therefore is only visible to David and Alex since they are the only ones present in that zone. Likewise, activity in the PJB Office is sent out on RdsChan4, which is published by governance zone 186 and therefore is only visible to Paul and Tom since they are the only ones present in that zone. Activity in Strange Room 1 is not visible anywhere, not even in Strange Room 1 since it doesn't specify an RDS Control Channel. Activity in Strange Room 2 is sent out on RdsChan5, which is published by governance zone 188 and therefore is broadcast to Matt in Strange Room 1. Thus, no one can see Matt's activity in Strange Room 1 (not even Matt) and only Matt can see Chris's activity in Strange Zone 2.

As explained above, the zones of a virtual area can be associated with respective switching rules, each of which instructs the area service to connect sources of a respective data stream type that are associated with a designated source zone with sinks of the respective realtime data stream type that are associated with a designated sink zone. Network nodes can establish respective presences in the zones of a virtual area. In some examples, network nodes associated with respective objects (e.g., avatars representing the communicants operating the network nodes) that can be moved to different locations in the virtual area, and the network nodes are present in the zones in which the associated objects are located. The area service administers data stream connections between the network nodes based on the switching rules, the respective sources and sinks associated with the network nodes, and the respective zones of the virtual area in which the objects are located.

In some examples, a virtual area includes multiple zones each of which supports an independent communication session between network nodes in the zone. For example, a virtual area may include zones in which audio, video, and text chat channel connections are established only between the sources and sinks of network nodes that are in the same zone. In these examples, the spatial visualizations of the virtual area that are presented on the client network nodes show, in a single view, all the independent communications that are occurring in the zones of the virtual area. This allows a user to see multiple simultaneous independent communication interactions in a single view and thereby quickly learn who is meeting with whom and the contexts of those meetings (as defined by the zones in which the meetings are occurring).

Figure 4:
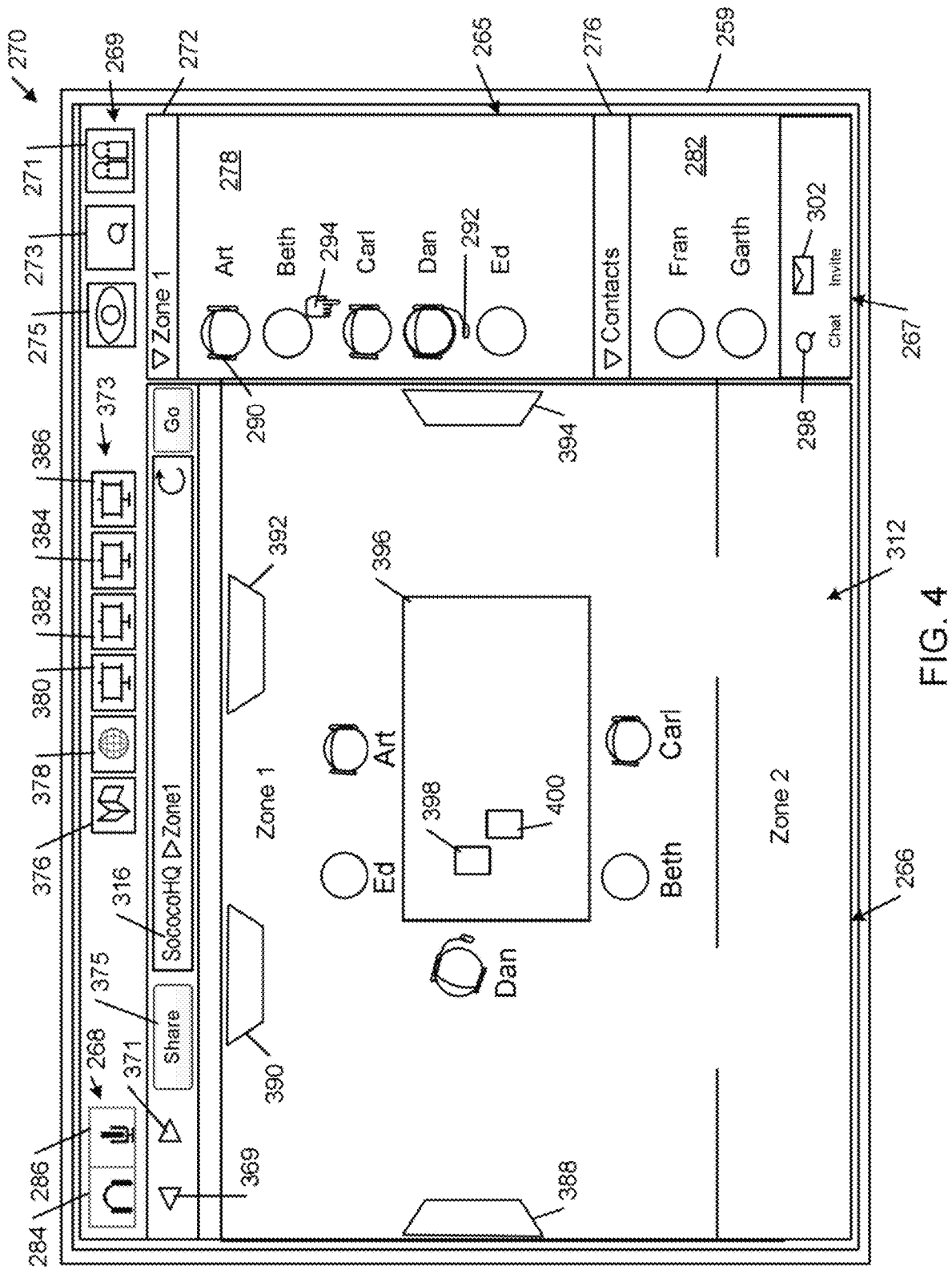
FIGS. 4-5 are diagrammatic views of graphical user interface examples.

FIG. 4 shows an exemplary graphical user interface 270 that is generated by an example of the communications application 26 in a window 259 on a display of the client network node from which a user of the client application ("Art" in this example) is operating. The graphical user interface 270 includes a people panel 265, a viewer panel 266, a people interaction toolbar 267, an audio interaction toolbar 268, and a set of panel view controls 269. The panel view controls 269 include a people panel button 271 for opening and closing the people panel 265, a Chat panel button 273 for opening and closing a Chat panel, and a viewer panel button 275 for opening and closing the viewer panel 266.

The people panel 266 depicts the realtime availabilities and activities of some or all of Art's contacts across different communication contexts. In the example shown in FIG. 4, the people panel 266 shows Art's communicants segmented into a virtual area groups section 278 and a contacts group section 282. The virtual area groups 278 section shows the presence and activity states in each of the area applications 44 of which Art is a member with respect to which at least one of Art and Art's contacts is present, grouped by virtual area application 44. The contacts group section 282 contains all or a selected portion of Art's contacts that are not represented in any of the virtual area groups. In the example shown in FIG. 4, the virtual area groups section 278 includes a single virtual area group (labeled with a header bar 272 entitled "SococoHQ") that identifies all the communicants who have a presence in the area application "SococoHQ," and contains the graphical representations (avatars) of the communicants (including at least one of Art or Art's contacts) who currently have presence in the SococoHQ area application 44. The contacts group section 282 is labeled with a header bar 276 entitled "Contacts" and identifies all of Art's contacts who are not shown in the virtual area groups section 278 (i.e., they either are not members of or not present in SococoHQ). The contacts group section 282 contains graphical representations (avatars) of all of the remaining ones of Art's contacts who are not present in or not members of SococoHQ. In the illustrated example: Art, Beth Carl, Dan, and Ed are members of the SococoHQ area application; and Fran and Garth are contacts of Art who are not present in SococoHQ.

Each communicant is represented graphically by a respective circular sprite that is labeled with a respective user name of the communicant (i.e., "Art," "Beth," "Carl," "Dan," "Ed," "Fran," and "Garth"). Each sprite also may be associated with a respective status line that includes additional information about the communicant. In some embodiments, each status line can include one or more of the following information: location of presence (e.g., a server application or a zone of that sever application); availability (e.g., busy, idle); a status message (e.g., "Out of the office next Wednesday"); and the name of the client node from which the communicant is operating (e.g., "workstation 1" or "mobile phone"). In some embodiments, the ordering of the spatial positions (e.g., from top to bottom) of the communicant avatars in each of the sections 278, 282 is alphabetical by user name. In other embodiments, the spatial positions of the communicant avatars in the area application section 278 are ordered in accordance with the temporal ordering of the communicants in terms of the times when the communicants established their respective presences with the server applications. The spatial positions of the communicant avatars in the contacts section 282 may be sorted alphabetically by user name, according to frequency of contact, according to recentness of contact, or according to other sorting or filtering criteria.

The activities of the communicants in the contexts of the area applications 44 may be inferred by the client communications application from activities on various communication channels over which the respective communicants are configured to communicate. The activities on the communication channels are represented in the graphical user interface 270 by visual cues that are depicted in association with the graphical representations of the communicants in the sections 278, 282. For example, the "on" or "off" state of a communicant's local speaker channel is depicted by the presence or absence of a headphones graphic 290 on the communicant's sprite. When the speakers of the communicant who is represented by the sprite are on, the headphones graphic 290 is present (see sprites Art, Carl, and Dan) and, when the communicant's speakers are off, the headphones graphic 290 is absent (see sprites Beth and Ed). The "on" or "off" state of the communicant's microphone is depicted by the presence or absence of a microphone graphic 292 on the communicant's sprite. When the microphone is on, the microphone graphic 292 is present (see sprite Dan); and, when the microphone is off, the microphone graphic 292 is absent (see sprites Art, Beth, Carl, and Ed). The headphones graphic 290 and the microphone graphic 292 provide visual cues of the states of the communicant's sound playback and microphone devices. In addition, the current activity state of a communicant's microphone channel is indicated by a dynamic visualization that lightens and darkens the communicant's avatar in realtime to reflect the presence or absence of audio data on the microphone channel. Thus, whether or not their local speakers are turned on, communicants can determine when another communicant is speaking by the "blinking" of the coloration of that communicant's avatar. The activity state of a communicant's text chat channel is depicted by the presence or absence of the hand graphic 294 adjacent the communicant's sprite (see sprite Beth). Thus, when a communicant is transmitting text chat data to another network node the hand graphic 294 is present, and when a communicant is not transmitting text chat data the hand graphic 294 is not present. In some embodiments, text chat data is transmitted only when keyboard keys are depressed, in which case the visualization of the current activity on communicant's text channel appears as a flashing on and off of the hand graphic 294.

Members of an area application are able to receive the visual cues of the communicant activities occurring in the context of that area application whether or not the member is present. For example, the graphical user interface 270 that is presented to Art can show visual cues indicating the activities on the communication channels of the communicants who are present in SococoHQ (where Art is present) and the activities communication channels of the communicants present in other areas of which Art is a member but not currently present.

The audio interaction toolbar 268 includes a headphone control 284 that enables Art to toggle on and off the local speakers of the client network node, and a microphone control 286 that enables Art to toggle on and off the local microphone of the client network node.

Additional details regarding embodiments of the people panel 265 are described in U.S. Provisional Patent Application No. 61/373,914, filed Aug. 16, 2010, and U.S. patent application Ser. No. 12/354,709, filed Jan. 15, 2009.

The people interaction toolbar 267 includes a Chat button 298 and an Invite button 302. Selection of the Chat button 298 opens a Chat panel 340 (see FIG. 5) that enables Art to initiate a chat with other communicants who are present in the area application where Art is present (i.e., SococoHQ in the illustrated example). Selection of the Invite button 302 opens an Invite window that enables Art to invite one or more communicants to a selected virtual area location (e.g., a virtual area 44 or zone within a virtual area 44). Additional details regarding embodiments of the methods and functions invoked by the Chat button 298 and the Invite button 302 are described in U.S. patent application Ser. No. 12/354,709, filed Jan. 15, 2009, and U.S. Provisional Patent Application No. 61/373,914, filed Aug. 16, 2010.

In addition to the control and panel elements of the graphical user interface 270 (e.g., the people panel 265, the viewer panel 266, the people interaction toolbar 267, the audio interaction toolbar 268, and the panel view controls 271, 273, 275), the graphical user interface 270 includes a Share button 375 and a set 373 of Viewer Panel control buttons, including a Map button 376, a Browse button 378, and four View Screen buttons 380-386. The Share button 375 initiates a screen share of the contents of the display area 312 of the viewer panel 266 in connection with a view screen in a virtual area. These contents include renderings of any information that is received by the browser component in connection with the network resource identified in the location bar 316, and a document or application that is being shared by the user in connection with a view screen object in a virtual area. The Map button 376 sets the view presented in the viewer panel 266 to a map view of the virtual area. The Browse button 378 sets the view presented in the viewer panel 266 to a browser view. Each of the four View Screen buttons 380-386 sets the viewer panel 266 to display the content the content being shared in connection with a corresponding one of the view screens in the virtual area.

FIG. 4 shows an example of the graphical user interface 270 in the Map view mode, which presents in the viewer panel 266 a rendered view of a zone (Zone 1) of the SococoHQ virtual area that is located at the location SococoHQ/Area1, as indicated in the location bar 316. This address indicates that Zone 1 is a zone within the SococoHQ virtual area.

Each of the communicants who is present in the virtual area is represented graphically by a respective avatar that corresponds to the communicant's avatar shown in the people panel 265. The virtual area is represented graphically by a two-dimensional top view of a rectangular space. In some examples, the communicants' sprites automatically are positioned in predetermined locations (or "seats") in the virtual area when the communicants initially enter a zone of the virtual area.

Zone 1 includes four view screen props (or "objects") 388, 390, 392, 394 and a table prop 396. Communicants interact with the props by selecting them with an input device (e.g., by single-clicking on the props with a computer mouse, touch pad, touch screen, or the like). The view screen props 388-394 are associated with application sharing functionality of the platform that enables communicants to share applications operating their respective client network nodes. The application sharing functionality is invoked by activating a view screen (e.g., by single-clicking the view screen object with an input device). In some embodiments, the platform provides visual cues that indicate whether or not a communicant is sharing an application over an application sharing channel. In response to a communicant's selection of the view screen prop, the communicant's sprite automatically is moved to a position in the graphical representation of the virtual area that is adjacent the view screen prop. The position of a communicant's sprite adjacent the view screen prop indicates that the communicant currently is sharing or is about to share an application with the other communicants in Zone 1. In addition, the avatar of each communicant who is viewing a shared application is depicted with a pair of "eyes" to indicate that the represented communicants are viewing the content being shared in connection with the view screen props (see, e.g., the avatars of Alex and Dan in FIG. 4). The graphical depiction of view screen prop is changed depending on whether or not an active application sharing session is occurring. For example, the depicted color of the view screen may change from a brighter color during an active application sharing session to a darker color when there is no application sharing taking place. Examples of the application sharing process are described in connection with FIGS. 26-28 of U.S. patent application Ser. No. 12/354,709, filed Jan. 15, 2009, and in U.S. patent application Ser. No. 12/418,270, filed Apr. 3, 2009.

In some examples, one or more of the viewscreen props 388-394 may be associated with respective uniform resource identifiers (URIs) of network resources to enable communicants to interact with and share information associated with the network resources in connection with the viewscreen objects as described in U.S. Provisional Patent Application No. 61/444,989, filed Feb. 21, 2011.

The table prop 396 is associated with file share functionality of the platform that enables communicants to upload computer data files to server storage in association with Zone 1 and to download data files that are associated with the Zone 1 from the server storage to the respective client network nodes. In example shown in FIG. 4, there are two document objects 398, 400 that are associated with the table prop 396. The document objects 398, 400 are linked to respective documents that are have been shared in Zone 1 and stored in server storage. Any of the document objects 398, 400 may be selected by a communicant (e.g., by double-clicking the document object 398 with an input device, such as a computer mouse) to initiate downloading of the associated document to the communicant's client network node. Additional details regarding the structure, function, and operation of the table prop 396 may be obtained from U.S. patent application Ser. No. 12/354,709, filed Jan. 15, 2009.

In the Map view mode, the navigational controls of the graphical user interface 270 allow the user to traverse a path through the virtual environment in accordance with a navigational model that is tied to the underlying spatial hierarchy of virtual area locations and objects (e.g., props) within the locations. The network infrastructure service environment records the path traversed by the user. In some embodiments, the network infrastructure service environment records a history that includes a temporally ordered list of views of the virtual area locations that are presented to the user as the user navigates through the virtual area. Each view typically corresponds to a view of a respective renderable zone of the virtual area. In these embodiments, the navigation controls enable the user to move to selected ones of the zones in the history. The navigation controls also include a graphical representation of a depth path that shows the location in the spatial hierarchy that corresponds to the user's current view of the virtual area. In some embodiments, the graphical representation of the depth path includes a respective user-selectable link to a respective view of each of the preceding levels in the spatial hierarchical model of the virtual area above the current view. The back button 369 corresponds to a backward control that enables the user to incrementally move backward to preceding ones of the zones in the history of the zones that were traversed by the user. The forward button 371 corresponds to a forward control that enables the user to incrementally move forward to successive ones of the zones in the history of the zones that were traversed by the user. Some examples additionally include a placemarks button that activates a placemarking control for storing links to zones and a placemark navigation control for viewing a list of links to previously placemarked zones. In response to user selection of the placemarking control, a placemark is created by storing an image of the location shown in the current view in association with a hyperlink to the corresponding location in the virtual area. In response to a user selection of the placemark navigation control, a placemarks window is presented to the user. The placemarks window includes live visualizations of all locations that have been placemarked by the user. Each of the images in the placemarks window is associated with a respective user-selectable hyperlink. In response to user selection of one of the hyperlinks in the placemarks window, a view of the virtual area corresponding to the location associated with the selected hyperlink is automatically displayed in the browsing area of the graphical user interface 270. Some examples include home button corresponds to a control that returns the user to a view of a designated "home" location in the virtual environment.

Additional details regarding the structure, function, and operation of examples of the navigation controls are described in U.S. patent application Ser. No. 12/354,709, filed Jan. 15, 2009.

Figure 5:
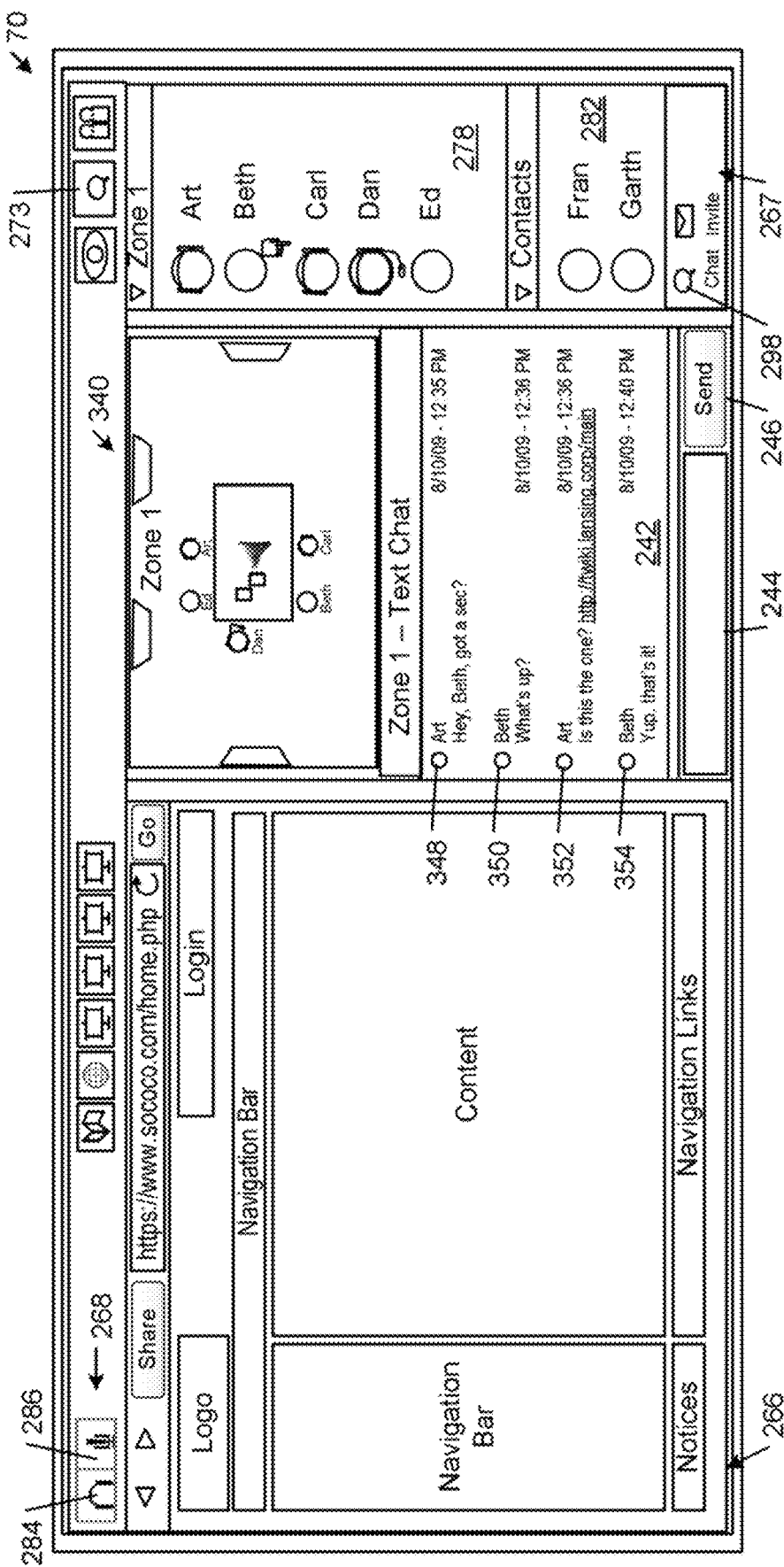

FIG. 5 shows an example of the graphical user interface 270 when the people panel 265 is open, a Chat panel 402 is open, and the viewer panel 266 is open in the browser mode.

Activating the Chat panel button 273 or the Chat button 298 opens the Chat panel 340. When the Chat panel button 273 is activated, the Chanel panel 340 opens to show a chat interface for a persistent virtual chat area for interactions occurring in connection with a respective virtual area. In the example shown in FIG. 5, Art activated the Chat panel button 273 at the time he was present in Zone 1; therefore, the Chat panel 340 shown in FIG. 5 contains the persistent virtual chat area for text chat interactions occurring in connection with Zone 1. When the Chat button 298 is activated, on the other hand, the Chat panel 340 opens to show a chat interface for a persistent personal virtual area for interactions between Art and a selected one of the communicants. Examples of personal virtual areas are described in U.S. patent application Ser. No. 12/509,658, filed Jul. 27, 2009.

The chat interface of the Chat panel 340 includes a chat log area 342, a text box 344, and a Send button 346. The Chat panel 340 also includes a minimap view of a virtual area (i.e., Zone 1 of the SococoHQ virtual area).

The user may enter text messages in the text box 344 and transmit the text messages to the other communicants who are in Zone 1 by selecting the Send button 346. The chat log area 342 displays a log of current and optionally prior events that are associated with Zone 1 of the SococoHQ area application. An exemplary set of events that may be displayed in the chat log area 342 include: text messages that the user has exchanged with other communicants in Zone 1; changes in the presence status of communicants in Zone 1; changes in the speaker and microphone settings of the communicants in Zone 1; and the status of the props (discussed below), including references to any applications and data files that are shared in connection with the props. In the illustrated embodiments, the events are labeled by the communicant's name followed by content associated with the event (e.g., a text message) or a description of the event.

The Chat panel 340 provides a context for organizing the presentation of the events that are displayed in the chat log area 342. For example, in the illustrated embodiment, each of the displayed events is labeled with a respective tag that visually correlates with the appearance of the sprite of the communicant that sourced the displayed event. In particular, each of the events that is sourced by a particular one of the communicants is labeled with a respective icon 348, 350, 352, 354 with a visual appearance (e.g., color-code, or design pattern) that matches the visual appearance of that communicant's sprite. In this example, the color of the icons 348, 352 matches the color of the body of Art's sprite, and the color of the icon 350, 354 matches the color of the body of Beth's sprite.

The virtual area platform 18 supports the creation of highly customizable virtual area applications that support realtime virtual area communications. In some examples, these services handle the complex tasks of managing communications between network nodes that are linked to a virtual area, switching connections between the network nodes in response to user inputs, and mixing realtime data streams according to rules embodied in the virtual area application defining the virtual area. The virtual area platform 18 provides a general purpose framework for transforming a designer's specification of a virtual area (e.g., an Extensible Markup Language (XML) document) into instructions that dynamically configure platform and application-specific services and other functionality for acting on messages that are received from network nodes in connection with the virtual area. In these ways, the virtual area platform 18 encourages the development of a wide variety of virtual area applications, including virtual area applications that implement spatial rules for one or more synchronous conferencing services (e.g., instant messaging, such as text chat, audio conferencing, video conferencing, application sharing, and file sharing). The virtual area platform 18 enables virtual area designers to focus on developing high-level communications functionality of a virtual area instead of low-level plumbing code, while maintaining control over the communication and interaction environment created by the virtual area.

The virtual area platform 18 supports the creation of network connections between network nodes in the same zone of a virtual area, as well as the creation of one-way or two-way data stream connections between network nodes in different zones.

FIG. 6 shows an example of a method by which the area service administers network connections between nodes in different zones. In accordance with this method, the area service administers one or more real-time data stream connections between network nodes in a virtual area that includes zones and has a spatial visualization (FIG. 6, block 410). Each of the network nodes respectively has at least one of a source and a sink of one or more data types and is associated with a respective object in a respective one of the zones of the virtual area (FIG. 6, block 412). Each of the zones is associated with a respective geometric boundary located in relation to the spatial visualization of the virtual area (FIG. 6, block 414). The area service administers connections between sources of ones of the network nodes associated with respective objects in a first one of the zones and outside a second one of the zones and sinks of respective ones of the network nodes associated with respective objects in the second zone and outside the first zone (FIG. 6, block 416).

In some examples of the method of FIG. 6, the area service locates (e.g., positions) the objects in respective ones of the zones of the virtual area based on requests received from the network nodes. The area service provides to respective ones of the network nodes a respective specification of the virtual area and state information locating graphical representations of the objects in the spatial visualization according to the zones in which the objects are located. Network nodes associated with respective objects in the first zone are able to communicate realtime data of a respective one of the data types to network nodes associated with respective objects in the second zone but network nodes associated with respective objects in the second zone are unable to communicate realtime data of the respective data type to network nodes associated with respective objects in the first zone. In some of these examples, network nodes associated with respective objects in the first zone are able to communicate realtime data of a respective one of the data types with each other. Similarly, in some examples, network nodes associated with respective objects in the second zone are able to communicate realtime data of a respective one of the data types with each other.

Figure 7A:
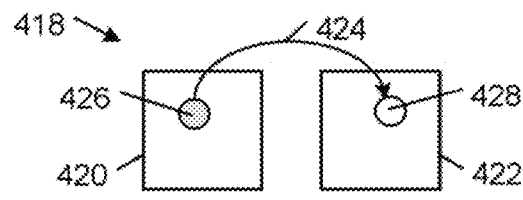
FIGS. 7A-7N are diagrammatic views of examples of zones and associated graphic representations of switching rules for connecting sources and sinks of respective data types.
Figure 7B:
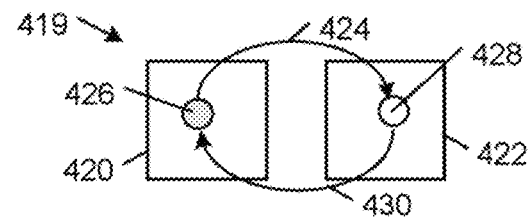
Figure 7C:
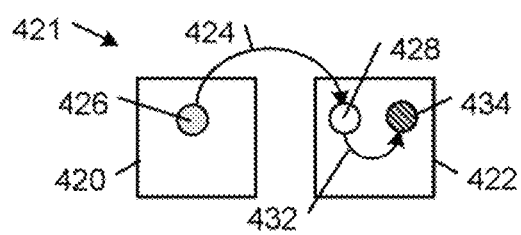
Figure 7D:
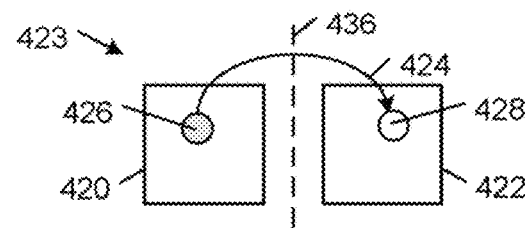
Figure 7E:
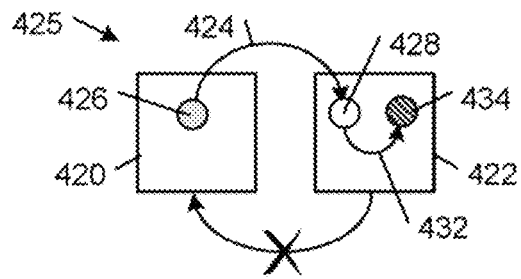
Figure 7F:
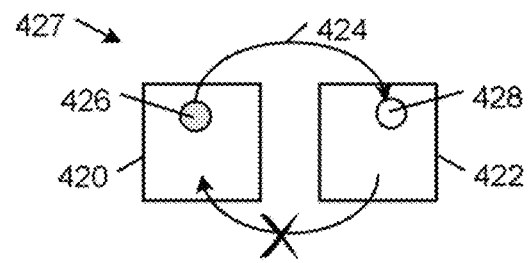
Figure 7G:
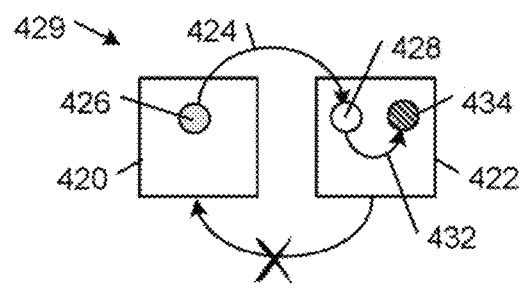
Figure 7H:
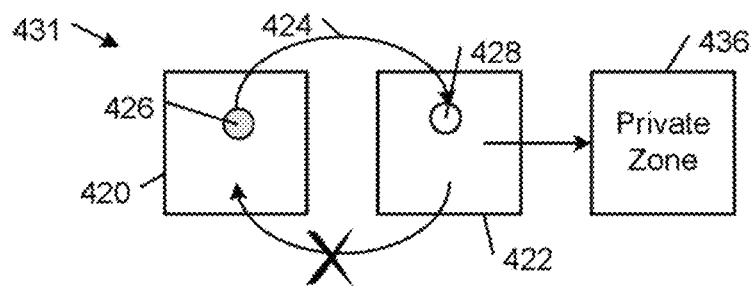
Figure 7I:
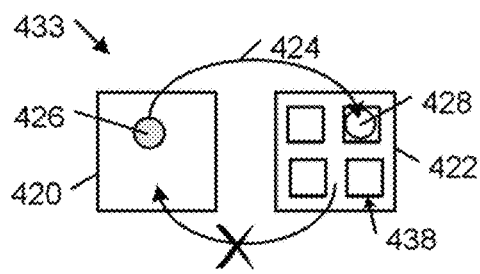
Figure 7J:
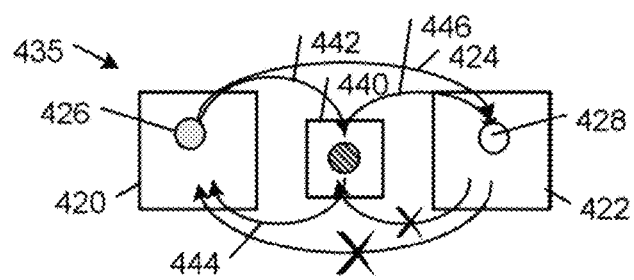
Figure 7K:
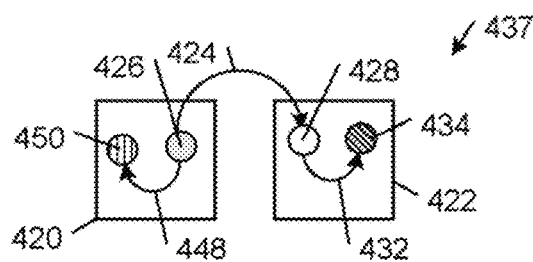
Figure 7L:
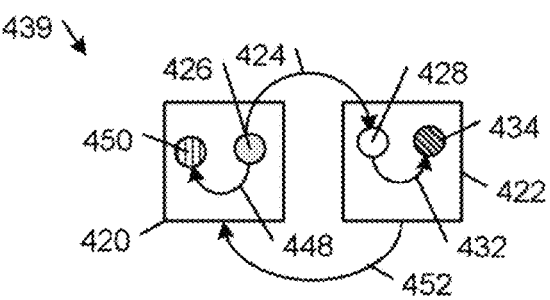
Figure 7M:
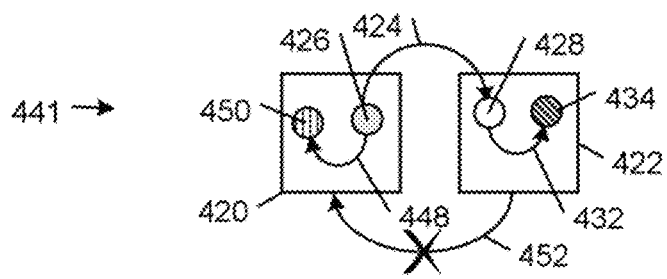
Figure 7N:
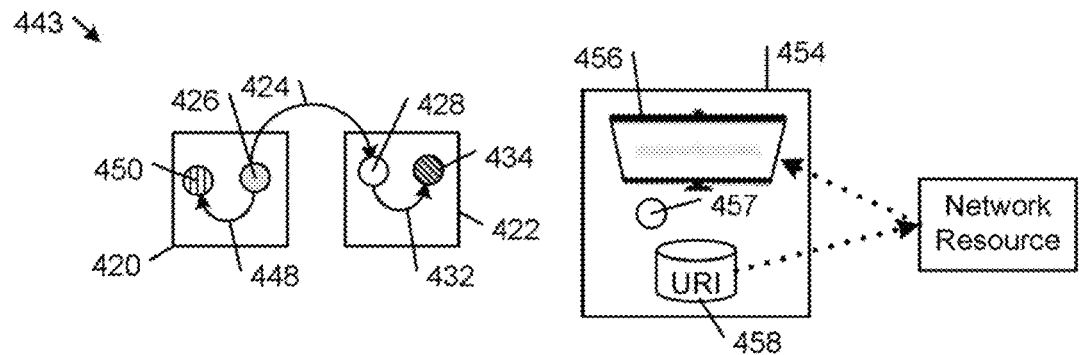

FIGS. 7A-7N show zones and associated graphic representations of switching rules for connecting sources and sinks of respective data types.

FIG. 7A shows an example of a virtual area 418 that includes a first zone 420 and a second zone 422. The first and second zones 420, 422 are associated with respective non-overlapping geometric boundaries. The first zone 420 is associated with a switching rule 424 that instructs the area service to connect sources of a specified data stream type in the first zone 420 with sinks of the specified data steam type in the second zone 422. Based on the presence of a first object 426 in the first zone 420 and a second object 428 in the second zone 422, the area service administers a connection between a source of the specified data type associated with the first object 426 and a sink of the specified data type associated with the second object 428.

FIG. 7B shows an example 419 of the virtual area 418 in which the second zone 422 is associated with a switching rule 430 that instructs the area service to connect sources of a second specified data stream type in the second zone 422 with sinks of the second specified data steam type in the first zone 420. Based on the presence of the first object 426 in the first zone 420 and the second object 428 in the second zone 422, the area service administers a connection between a source of the specified data type associated with the first object 426 and a sink of the specified data type associated with the second object 428; the area service also administers a connection between a source of the second specified data type associated with the second object 438 and a sink of the second specified data type associated with the first object 426. In some examples, the first and second specified data types are the same. In other examples, the first and second specified data types are different. In some examples, the area service administers the connections between the sources of the network nodes associated with respective objects in the first zone 420 and the sinks of the network nodes associated with respective objects in the second zone 422 conditioned on a particular role attribute value being associated with the network nodes associated with respective objects in the first zone. In some examples, the area service administers the connections between the sources of the network nodes associated with respective objects in the first zone 420 and the sinks of the network nodes associated with respective objects in the second zone 422 conditioned on a particular role attribute value being associated with the network nodes associated with respective objects in the second zone 422.

FIG. 7C shows an example 421 of the virtual area 418 in which the second zone 422 is associated with a switching rule 432 that instructs the area service to connect sources of a second specified data stream type in the second zone 422 with sinks of the second specified data steam type in the second zone 422. Based on the presence of the second object 428 in the second zone 422 and the presence of a third object in the second zone 422, the area service administers a connection between sources of the second specified data type associated with the second and third objects 428, 434 and a sinks of the second specified data type associated with the second and third objects 428, 434. In some examples, the first and second specified data types are the same. In other examples, the first and second specified data types are different. In some examples, respective ones of the connections is conditioned on a particular role attribute value being associated with the network nodes associated with respective objects in the second zone 422. In some examples, the administering of respective ones of the connections is conditioned on a particular role attribute value being associated with the network nodes associated with respective objects in the second zone 422.

FIG. 7D shows an example 423 of the virtual area 418 in which a barrier object 436 is between the first zone 420 and the second zone 422. The barrier object 436 has an open state and a closed state. In some examples (e.g., where the barrier object is a door object), based on a determination that the barrier object 436 is in the open state, the area service allows connections between sources of ones of the network nodes associated with respective objects in the first zone 420 and sinks of respective ones of the network nodes associated with respective objects in the second zone 422; and based on a determination that the barrier object 436 is in the closed state, the area service disallows connections between sources of ones of the network nodes associated with respective objects in the first zone 420 and sinks of respective ones of the network nodes associated with respective objects in the second zone 422. In other examples (e.g., where the barrier object is a curtain object), based on a determination that the barrier object is in the open state, the area service configures connections between sources of ones of the network nodes associated with respective objects in the first zone 420 and sinks of respective ones of the network nodes associated with respective objects in the second zone 422 for a first level of data access; and based on a determination that the barrier object is in the closed state, the area service configures connections between sources of ones of the network nodes associated with respective objects in the first zone 420 and sinks of respective ones of the network nodes associated with respective objects in the second zone 422 for a second level of data access lower than the first level.

FIG. 7E shows an example 425 of the virtual area 421 (FIG. 7C) in which the area service does not enable connections between sources of respective ones of the network nodes that are associated with respective objects in the second zone 422 and sinks of respective ones of the network nodes that are associated with respective objects in the first zone 420. In some examples, these connections are not enabled because the second zone 422 is not associated with any switching rule that enables connections of this type to be administered.

FIG. 7F shows an example 427 of the virtual area 418 in which the area service does not enable connections between sources of respective ones of the network nodes that are associated with respective objects in the second zone 422 and sinks of respective ones of the network nodes that are associated with respective objects in the first zone 420. In some examples, these connections are not enabled because the second zone 422 is not associated with any switching rule that enables connections of this type to be administered. In some examples, the area service administers voice connections between voice sources of respective ones of the network nodes associated with respective objects in the first zone 420 and voice sinks of respective ones of the network nodes associated with respective objects in the second zone 422 without enabling voice connections between voice sources of respective ones of the network nodes associated with respective objects in the second zone 422 and voice sinks of respective ones of the network nodes associated with respective objects in the first zone 420. In some examples, the area service administers application sharing connections between application sharing sources of respective ones of the network nodes associated with respective objects in the first zone 420 and application sharing sinks of respective ones of the network nodes associated with respective objects in the second zone 422 without enabling application sharing connections between application sharing sources of respective ones of the network nodes associated with respective objects in the second zone 422 and application sharing sinks of respective ones of the network nodes associated with respective objects in the first zone 420.

FIG. 7G shows an example 429 of the virtual area 427 (FIG. 7F) in which the second zone 422 is associated with a switching rule 432 that instructs the area service to connect sources of a second specified data stream type in the second zone 422 with sinks of the second specified data steam type in the second zone 422. Based on the presence of the second object 428 in the second zone 422 and the presence of a third object in the second zone 422, the area service administers a connection between sources of the second specified data type associated with the second and third objects 428, 434 and a sinks of the second specified data type associated with the second and third objects 428, 434 without enabling connections between sources of respective ones of the network nodes associated with respective objects in the second zone 422 and sinks of respective ones of the network nodes associated with respective objects in the first zone 420. In some examples, the area service administers chat connections between chat sources of respective ones of the network nodes associated with respective objects in the second zone 422 and chat sinks of respective ones of the network nodes associated with respective objects in the second zone 422 without enabling chat connections between chat sources of respective ones of the network nodes associated with respective objects in the second zone 422 and chat sinks of respective ones of the network nodes associated with respective objects in the first zone 420.

FIG. 7H shows an example 431 of the virtual area 427 (FIG. 7F) in which the area service responds to a request from a requesting one of the network nodes associated with respective objects in the second zone 422 to communicate with another one of the network nodes associated with respective objects in the second zone 422 by establishing respective presences of the requesting network node and the other network node in a private zone 436 associated with the requesting network node and the other network node. The area service also administers connections for exchanging realtime data streams between the requesting network node and the other network node in the private zone 436. In some examples, the private zone 436 is a zone of a private virtual area of the type described in U.S. patent application Ser. No. 12/509,658, filed Jul. 27, 2009.

FIG. 7I shows an example 433 of the virtual area 427 (FIG. 7F) in which the second zone 422 encompasses a plurality of sub-zones 438 defining locations where network nodes are permitted to be present in the second zone 422. In some examples, the area service administers connections 424 (e.g., voice connections) between sources of respective ones of the network nodes associated with respective objects in the first zone 420 and sinks of respective ones of the network nodes associated with respective objects in the sub-zones of the second zone 422. For each of one or more of the sub-zones 438, the area service administers connections for exchanging realtime data streams of a particular data type between respective ones of the network nodes associated with respective objects in the sub-zone 438 without enabling connections for exchanging realtime data streams of the particular data type between respective ones of the network nodes associated with respective objects in the sub-zone 438 and respective ones of the network nodes associated with respective objects outside the sub-zone 438.

FIG. 7J shows an example 435 of the virtual area 427 (FIG. 7F) that includes a third zone 440. The area service administering connections between sources of respective ones of the network nodes associated with respective objects in the first zone 420 and sinks of respective ones of the network nodes associated with respective objects in the second zone 422 without enabling connections between sources of respective ones of the network nodes associated with respective objects in the second zone 422 and sinks of respective ones of the network nodes associated with respective objects in the first zone 420. The area service administers connections 442 between sources of respective ones of the network nodes associated with respective objects in the first zone 420 and sinks of respective ones of the network nodes associated with respective objects in the third zone 440. The area service administers connections 444 between sources of respective ones of the network nodes associated with respective objects in the third zone 440 and sinks of respective ones of the network nodes associated with respective objects in the first zone 420. The area service administers connections 446 between sources of respective ones of the network nodes associated with respective objects in the third zone 440 and sinks of respective ones of the network nodes associated with respective objects in the second zone 422 without enabling connections between sources of respective ones of the network nodes associated with respective objects in the second zone 422 and sinks of respective ones of the network nodes associated with respective objects in the third zone 440. In some examples, the area service administers voice connections between the voice sources and sinks in the first and third zones 420, 440 and voice connections from the first and third zones 420, 440 to the second zone 422 without enabling voice connections from the second zone 422 to any of the first and third zones 420, 440.

In some examples of the virtual area 435, the third zone 440 includes a first sub-zone and a second sub-zone that define locations where network nodes are permitted to be present in the third zone 440. In some of these examples, the administering of the voice connections between voice sources of the network nodes associated with respective objects in the third zone and voice sinks of the network nodes associated with respective objects in the first and second zones 420, 422 involves administering connections between network nodes associated with respective objects in the first sub-zone without enabling connections between respective ones of the network nodes associated with respective objects in the second sub-zone and respective ones of the network nodes associated with respective objects in the first and second zones 420, 422. In some examples, the area service enables only a single one of the network nodes associated with respective objects in the third zone 440 to be present in the first sub-zone at a time, and locating in the second sub-zone each of the network nodes that is associated with respective objects in the third zone but not present in the first sub-zone.

In some examples of the virtual area 435, the virtual area is associated with a visualization of a virtual auditorium comprising a visualization of a stage area associated with the first zone, a visualization of a general seating area associated with the second zone, and a visualization of a microphone prop in the first sub-zone of the third zone 440.

FIG. 7K shows an example 437 of the virtual area 421 (FIG. 7C) in which the first zone 420 is associated with a switching rule 448 that instructs the area service to connect sources of a third specified data stream type in the first zone 420 with sinks of the third specified data steam type in the first zone 420. Based on the presence of the first object 426 in the first zone 420 and the presence of a third object 450 in the first zone 420, the area service administers a connection between sources of the third specified data type associated with the first and third objects 426, 450 and a sinks of the third specified data type associated with the first and third objects 426, 434.

In some examples of the virtual area 437, the area service administers voice connections between voice sources of respective ones of the network nodes associated with respective objects in the first zone 420 and voice sinks of respective ones of the network nodes associated with respective objects in any of the first zone 420 and the second zone 422, and additionally administers voice connections between voice sources of respective ones of the network nodes associated with respective objects in the second zone 422 and voice sinks of respective ones of the network nodes associated with respective objects in the second zone 422. In some examples, the area service administers chat connections between chat sources of respective ones of the network nodes associated with respective objects in the first zone 420 and chat sinks of respective ones of the network nodes associated with respective objects in any of the first zone 420 and the second zone 422, and additionally administers chat connections between chat sources of respective ones of the network nodes associated with respective objects in the second zone 422 and chat sinks of respective ones of the network nodes associated with respective objects in any of the first zone 420 and the second zone 422.

FIG. 7L shows an example 439 of the virtual area 437 (FIG. 7K) in which the area service additionally administers connections 452 between sources of respective ones of the network nodes associated with respective objects in the second zone 422 and sinks of respective ones of the network nodes associated with respective objects in the first zone 420. In some examples, the administered connections 452 are voice connections.

FIG. 7M shows an example 441 of the virtual area 439 (FIG. 7L) in which the area service does not enable connections between sources of respective ones of the network nodes associated with respective objects in the second zone 422 and voice sinks of respective ones of the network nodes associated with respective objects in the first zone 420. In some of these examples, the administering of voice connections between voice sources of respective ones of the network nodes associated with respective objects in the second zone and voice sinks of respective ones of the network nodes associated with respective objects in the second zone is performed without enabling connections between voice sources of respective ones of the network nodes associated with respective objects in the second zone 422 and voice sinks of respective ones of the network nodes associated with respective objects in the first zone 420.

FIG. 7N shows an example 443 of the virtual area 437 (FIG. 7K) that includes a third zone 454 that includes a viewscreen object 456 associated with a uniform resource identifier (URI) value 458 identifying a network resource for providing information to a network node in association with the viewscreen object 456. Based on a request received in connection with the viewscreen object 456 from a requesting one of the network nodes associated with a respective object 457 in the third zone 454, the area service administers a connection between the network resource and the requesting network node. In some examples, the spatial visualization of the virtual area 443 corresponds to a support center in which the third zone corresponds to a support room (e.g., a self-guided tour room or a demonstration room).

The virtual areas described above may be used as standalone virtual areas or as components of other virtual areas.

Figure 8A:
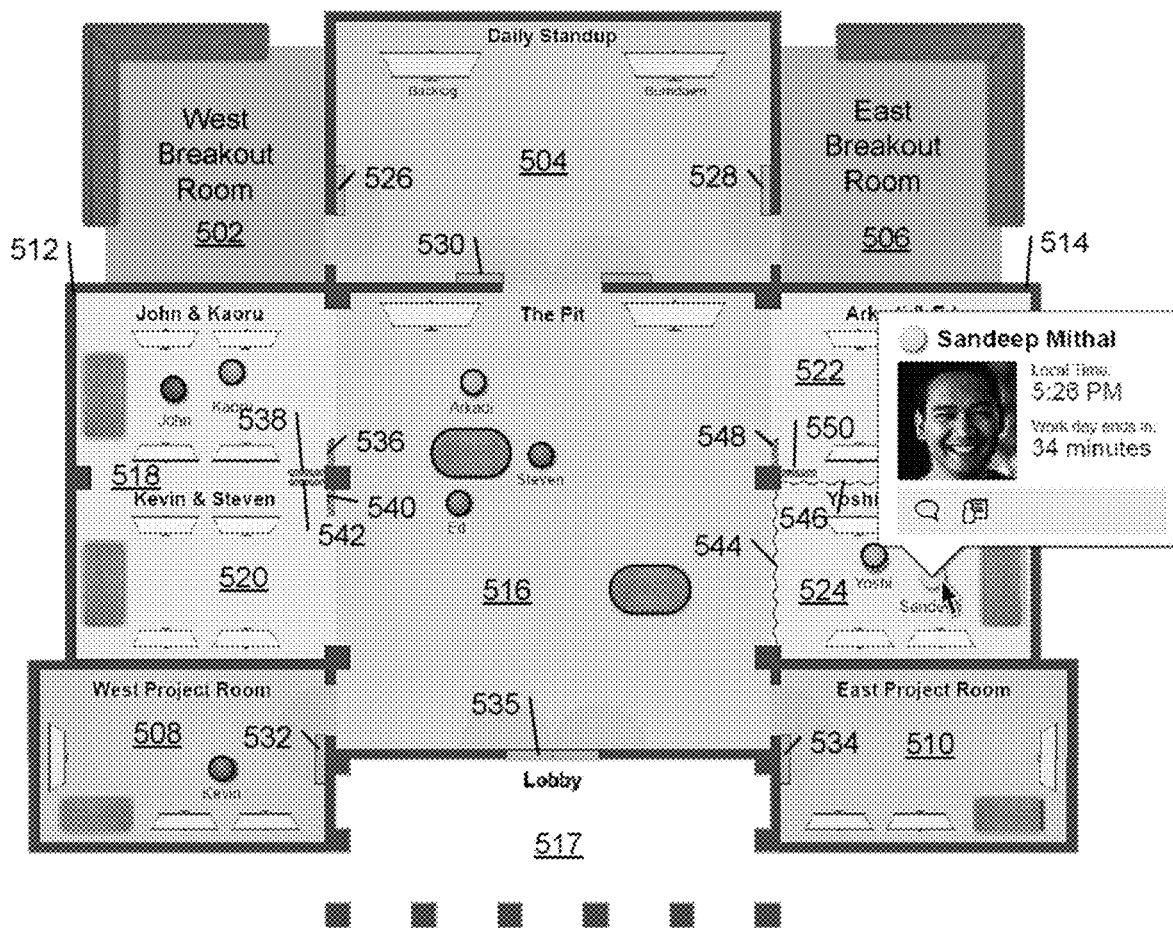
FIG. 8A is a diagrammatic view of an example of a virtual area that includes a spatial layout of zones.

FIG. 8A shows an example of a virtual area 500 that includes a spatial arrangement of zones that are visualized as virtual rooms and are associated with barrier objects. The virtual area 500 includes a West Breakout Room 502, a Daily Standup Room 504, an East Breakout Room 506, a West Project Room 508, an East Project Room 510, a West Cubicle Area 512, an East Cubicle Area 514, The Pit 516, and the Lobby 517. The West Cubicle Area 512 and the East Cubicle Area 514 includes a respective pair of cubicles 518, 520 and 522, 524. Each of the rooms except the West Breakout Room 502, the East Breakout Room 506, and the Lobby 517 includes two or more viewscreen objects and at least one table object, which function as described above.

Each of the West Breakout Room 502, the East Breakout Room 504, the Daily Standup Room 504, the West Project Room 508, the East Project Room 510, and the Lobby 517 includes a respective door object 526, 528, 530, 532, 534, 535. In some examples, the door objects 526-534 correspond to the door objects described in U.S. Provisional Patent Application No. 61/535,910, filed Sep. 16, 2011. In other examples, each of the door objects 526-534 is either in an open state or a closed state. The area service allows switching rule specified connections to be established through a door object that is in an open state, whereas the area service prevents such connections from being established through a door object that is in a closed state. In the state shown in FIG. 8A, the doors 526, 528, 530, 532, and 534 are open and only the Lobby door 535 is closed.

Each of the cubicles 518-524 includes a respective pair of curtain (or screen) objects 536, 538, 540, 542, 544, 546, 548, 550. In some examples, each of the curtain objects 536-550 is either in an open state or a closed state. When a curtain object is in an open state, the area service allows switching rule specified connections to be established through the curtain object at a first access level; and when a curtain object is in a closed state the area service allows switching rule specified connections to be established through the curtain object at a second access level that is lower than the first access level. In some examples, the access level corresponds to the settings of one or more parameters that are used to configure the connections. For example, in the case of audio stream connections, the access level typically corresponds to the volume of the rendered audio stream, where the first access level typically corresponds to full volume audio and the second access level corresponds to reduced volume audio. In another example, in the case of video stream connections, the access may correspond to separate settings for the audio and video components (e.g., the first access level may correspond to full audio and reduced resolution video, and the second access level may correspond to reduced audio and no video). In the state shown in FIG. 8A, the curtains 538, 536, 540, 542, 548, and 550 are open and the curtains 544 and 546 are closed.

Figure 8B:
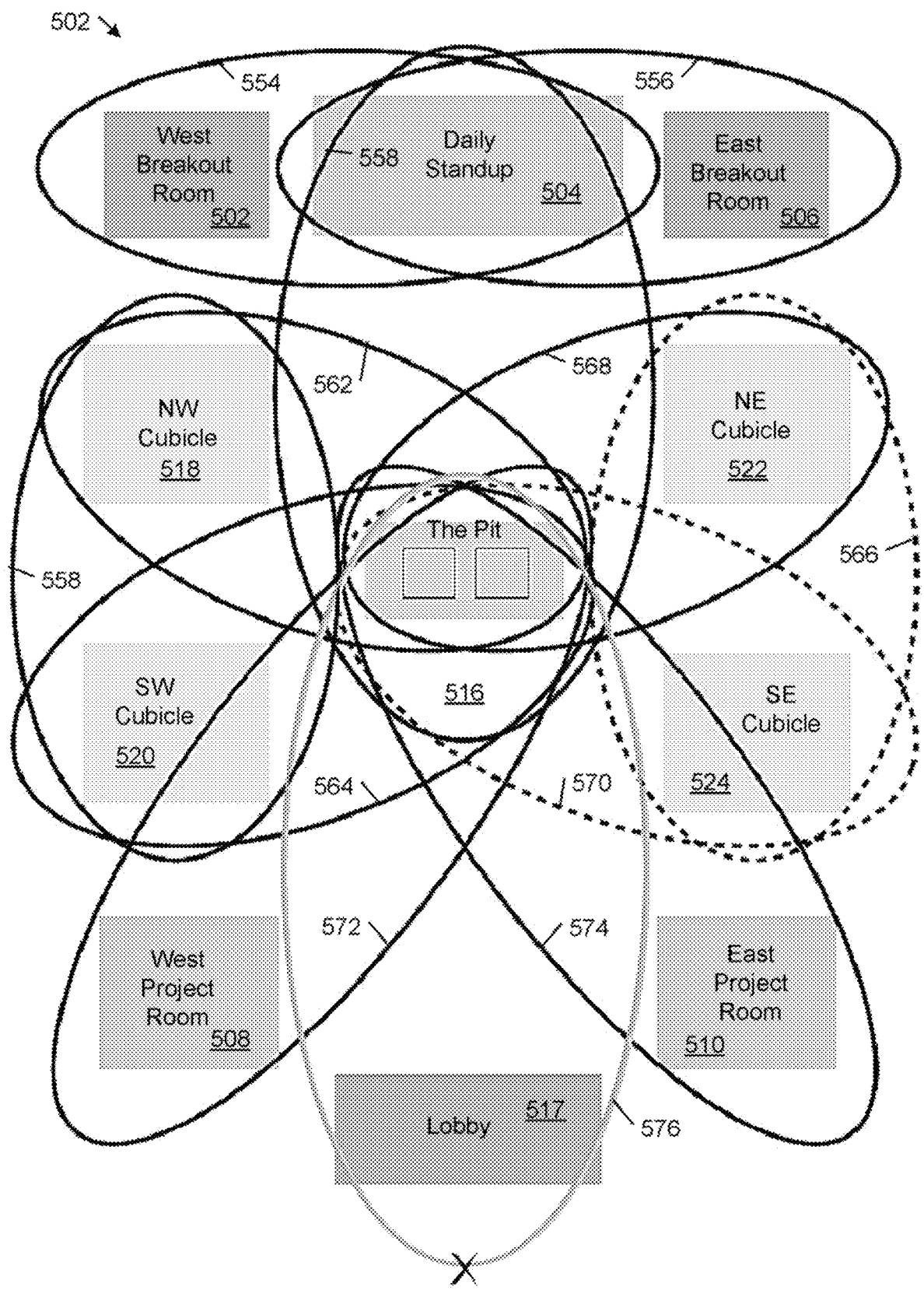
FIG. 8B is a diagrammatic view of an example of a zone map for the virtual area of FIG. 8A.

FIG. 8B shows an example of a zone map 552 for the virtual area 500. For the purpose of illustration only, the zones are assumed to be audio zones, and each zone is associated with at least one switching rule that instructs the area service to connect the audio source and audio sink of each network node in the zone with complementary audio sources and sinks of the other network nodes in the same zone. In other examples, the zones may be associated with respective switching rules for switching for switching any of one or more data stream types; in some examples, one or more of the zones are not associated with any switching rules. In the example shown in FIG. 8B, each of the rooms 502, 504, 506, 508, 510, 517, 518, 522, and 524 corresponds to a respective audio zone. In addition, the Daily Standup Room 504 shares a respective audio zone 554, 556, 558 with each of the West Breakout Room 502, the East Breakout Room 506, and The Pit 516. The audio zones 554, 556, 558 overlap in the Daily Standup Room 504 such that a communicant in the Daily Standup Room 504 can receive audio from and transmit audio into each of the West Breakout Room 502, the East Breakout Room 506, and The Pit 516; however, a communicant in the West Breakout Room 502 does not receive audio from nor transmit audio into any of the East Breakout Room and The Pit 516, and vice versa. The cubicles 518 and 520 share an audio zone 560 with each other, and each cubicle 518, 520 shares a respective audio zone 562, 564 with The Pit 516. Similarly, the cubicles 522, 524 share an audio zone 566 with each other, and each cubicle 522, 524 shares a respective audio zone 568, 570 with The Pit 516. The Pit 516 also shares a respective audio zone 572, 574, 576 with each of the West Project Room 508, the East Project Room 510, and the Lobby 517.

In the illustrated example, audio connections between network nodes in the same room 502, 504, 506, 508, 510, 517, 518, 522, and 524 are allowed. In addition, since the doors 526, 528, 530, 532, and 534 are open, the inter-room audio connections defined by the audio zones 554, 556, 558, 572, and 574 are allowed, whereas the audio connections defined by the audio zone 576 between The Pit 516 and the Lobby 517 are blocked since the Lobby door 335 is closed. Also, since the curtains 536, 538, 540, 542, 548, and 550 are open, the inter-room audio connections defined by the audio zones 558, 562, 564, and 568 are allowed, whereas the audio connections defined by the audio zones 566, 570 are configured at a reduced access (e.g., volume) level since the curtains 544, 546 are closed.

Figure 9A:
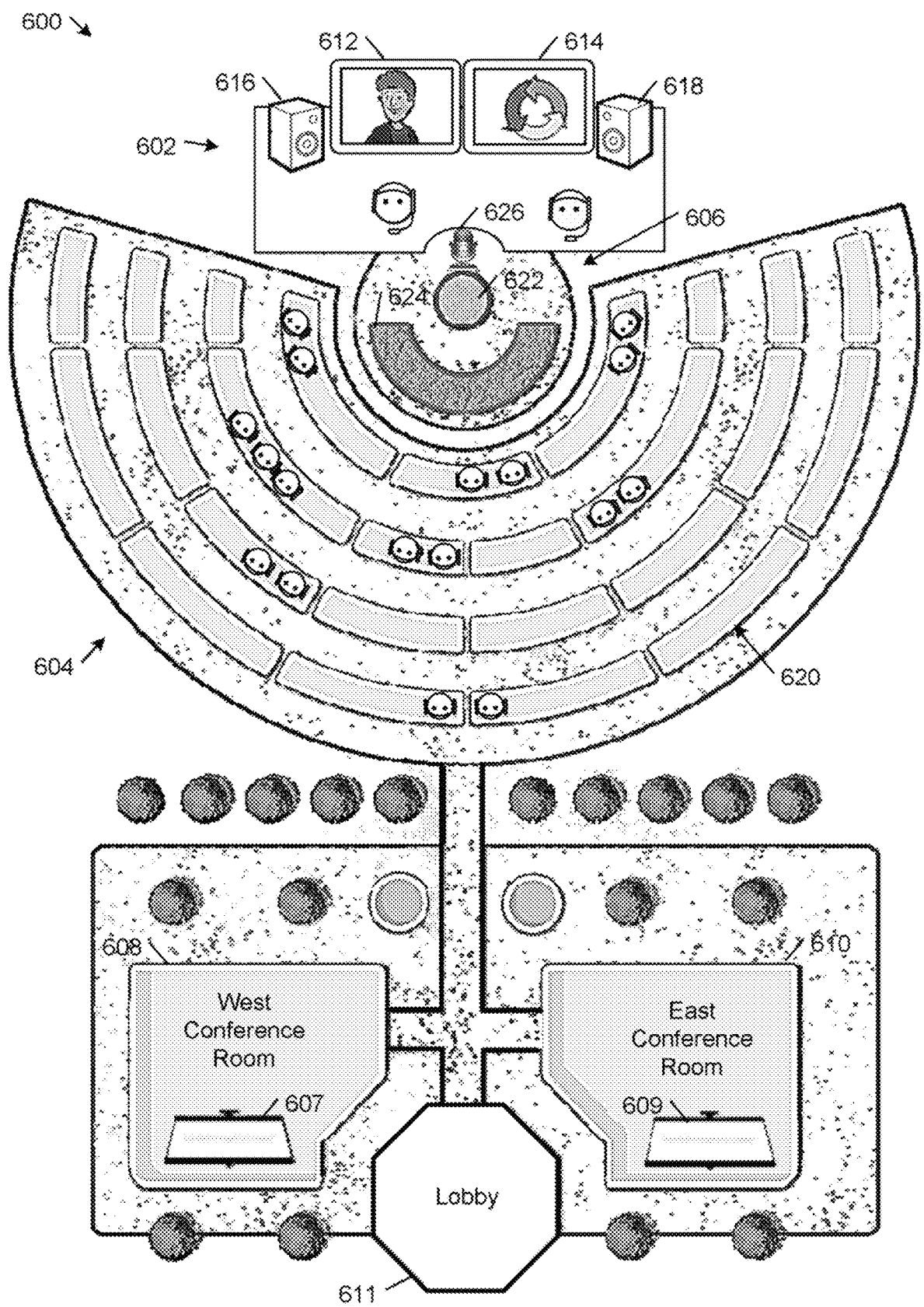
FIG. 9A is a diagrammatic view of an example of a virtual area.

FIG. 9A shows and example of a virtual area 600 that includes zones and is associated with a visualization of an auditorium. The virtual area 600 includes a stage (or podium) zone 602, a general seating zone 604, a question-and-answer zone 606, a West Conference Room 608, an East Conference Room 610, and a Lobby 611. The stage zone 602 includes viewscreen objects 612, 614 and speaker props 616, 618. The general seating zone 604 includes a plurality of sub-zones 620 (referred to herein as "bench zones") defining locations where network nodes are permitted to be present in the general seating zone 604. The question-and-answer zone 606 includes a microphone sub-zone 622, a queuing sub-zone 624, and a microphone prop 626. Each of the West Conference Room 608 and the East Conference Room 610 includes a respective viewscreen object 607, 609.

In some examples, the area service automatically orients the avatars in the stage zone 602 to face the question-and-answer zone 606 and the general seating zone 604, and automatically orients the avatars in the general seating zone and the question-and answer zone 606 to face the stage zone 602.

In some examples, the area service enables only a single one of the network nodes that are associated with respective objects in the question-and-answer zone 606 to be present in the microphone sub-zone 622 at a time; each of the other network nodes in the question-and-answer zone 606 are placed in the queuing sub-zone 624 in a first-in-first-out (FIFO) order. After the network node currently in the microphone sub-zone 622 leaves the microphone sub-zone 624, the area service automatically moves the next network node in line from the queuing sub-zone 624 to the microphone sub-zone 622.

FIG. 9B shows an example of a zone map 630 that defines how data streams are sourced and sunk in the virtual area 600. The zone map 630 includes a respective governance zone (GZ) for each of the location zones: GZ2 corresponds to the stage zone 602; GZ3 corresponds to the question-and-answer zone 606; GZ4 corresponds to the microphone sub-zone 622; GZ5 corresponds to the queuing sub-zone 624, GZ6 corresponds to the general seating zone 604; GZ7 corresponds to the West Conference Room 608; GZ8 corresponds to the East Conference Room 610; and GZ9 corresponds to the Lobby 611. The zone map 630 also includes an auditorium wide zone 632 (GZ1).

There are four control channels for audio: AudioChan1, AudioChan2, AudioChan3, and AudioChan4.

Audio data streams sourced from any of the stage zone 602 (GZ2) and the microphone zone 622 (GZ4) are published on the audio control channel AudioChan1, which is published by an area/zone manager for the auditorium wide governance zone 632 (GZ1). As a result, all communicants in the stage zone 602, the question-and-answer zone 606, and the general seating zone 604 can subscribe to AudioChan1 and thereby receive the audio data streams sourced from the stage zone 602 and the microphone zone 622.

Audio data streams sourced from the West Conference Room 608 (GZ7) are published on AudioChan2, which is published by an area/zone manager for the West Conference Room 608 so that network nodes in the West Conference Room 608 can communicate with each other via audio. Audio data streams sourced from the East Conference Room 610 (GZ8) are published on AudioChan3, which is published by an area/zone manager for the East Conference Room 610 so that network nodes in the East Conference Room 610 can communicate with each other via audio. Audio data streams sourced from the Lobby 611 (GZ9) are published on AudioChan4, which is published by an area/zone manager for the Lobby 611 so that network nodes in the Lobby 611 can communicate with each other via audio.

There are four control channels for application sharing: ScreenChan1, ScreenChan2, ScreenChan3, and ScreenChan4.

Application sharing data streams associated with viewscreen objects 612, 614 in the stage zone 602 (GZ2) are respectively published on the application sharing control channels ScreenChan1 and ScreenChat2, which are published by an area/zone manager for the auditorium wide governance zone 632 (GZ1). As a result, all communicants in the stage zone 602, the question-and-answer zone 606, and the general seating zone 604 can subscribe to Screen-Chan1 and/or ScreenChat2 and thereby receive the audio data streams sourced from the stage zone 602 and the microphone zone 622.

Application sharing data streams sourced from the West Conference Room 608 (GZ7) in connection with the viewscreen object 606 are published on ScreenChan3, which is published by an area/zone manager for the West Conference Room 608 so that network nodes in the West Conference Room 608 can share applications and network resources with each other. Application sharing data streams sourced from the East Conference Room 610 (GZ8) in connection with viewscreen object 609 are published on ScreenChan4, which is published by an area/zone manager for the East Conference Room 610 so that network nodes in the East Conference Room 610 can share applications and network resources with each other.

There are four control channels for text chat: ChatChan1, ChatChan2, ChatChan3, and ChatChan4. Chat data streams sourced from the general seating zone 604 (GZ6) are published on ChatChan1, which is published by an area/zone manager for the general seating zone 604 so that network nodes in the general seating zone 604 can communicate with each other via text chat. Chat data streams sourced from the West Conference Room 608 (GZ7) are published on ChatChan2, which is published by an area/zone manager for the West Conference Room 608 so that network nodes in the West Conference Room 608 can communicate with each other via text chat. Chat data streams sourced from the East Conference Room 610 (GZ8) are published on ChatChan3, which is published by an area/zone manager for the East Conference Room 610 so that network nodes in the East Conference Room 610 can communicate with each other via text chat. Chat data streams sourced from the Lobby 611 (GZ9) are published on ChatChan4, which is published by an area/zone manager for the Lobby 611 so that network nodes in the Lobby 611 can communicate with each other via text chat.

In the example shown in FIG. 9B, the bench sub-zones 620 are location-only zones that all publish to a common chat control channel (ChatChan1) for the general seating zone 604. In other examples, each of the bench sub-zones 620 is associated with its own chat control channel on which chat data streams sourced from the bench sub-zone are published only in that bench sub-zone. In this way, only communicants in the same bench sub-zone 620 can communicate with each other via text chat. In other examples, the chat control channel for each bench sub-zone 620 are published in the sourcing bench sub-zone and in each of a set of bench sub-zones that neighbor the sourcing bench sub-zone (e.g., each of the bench sub-zones that are adjacent the sourcing bench sub-zone).

In some examples, a communicant in general seating zone 604 is able to initiate a private communication session with another communicant in in the general seating zone (e.g., with a communicant in the same bench sub-zone or in a neighboring bench sub-zone) in a private virtual area of the type described in U.S. patent application Ser. No. 12/509, 658, filed Jul. 27, 2009 (see FIG. 7H).

The queuing zone 624 (GZ5) does not publish any data streams. Therefore, network nodes in the queuing zone 624 cannot source any data stream to other network nodes, whether the other network nodes are in the queuing zone 624 or in any other zone of the virtual area 600. The queuing zone 624, however, can sink the audio and application data streams published on the AudioChan1, ScreenChan1, and ScreenChan2 control channels.

Figure 10A:
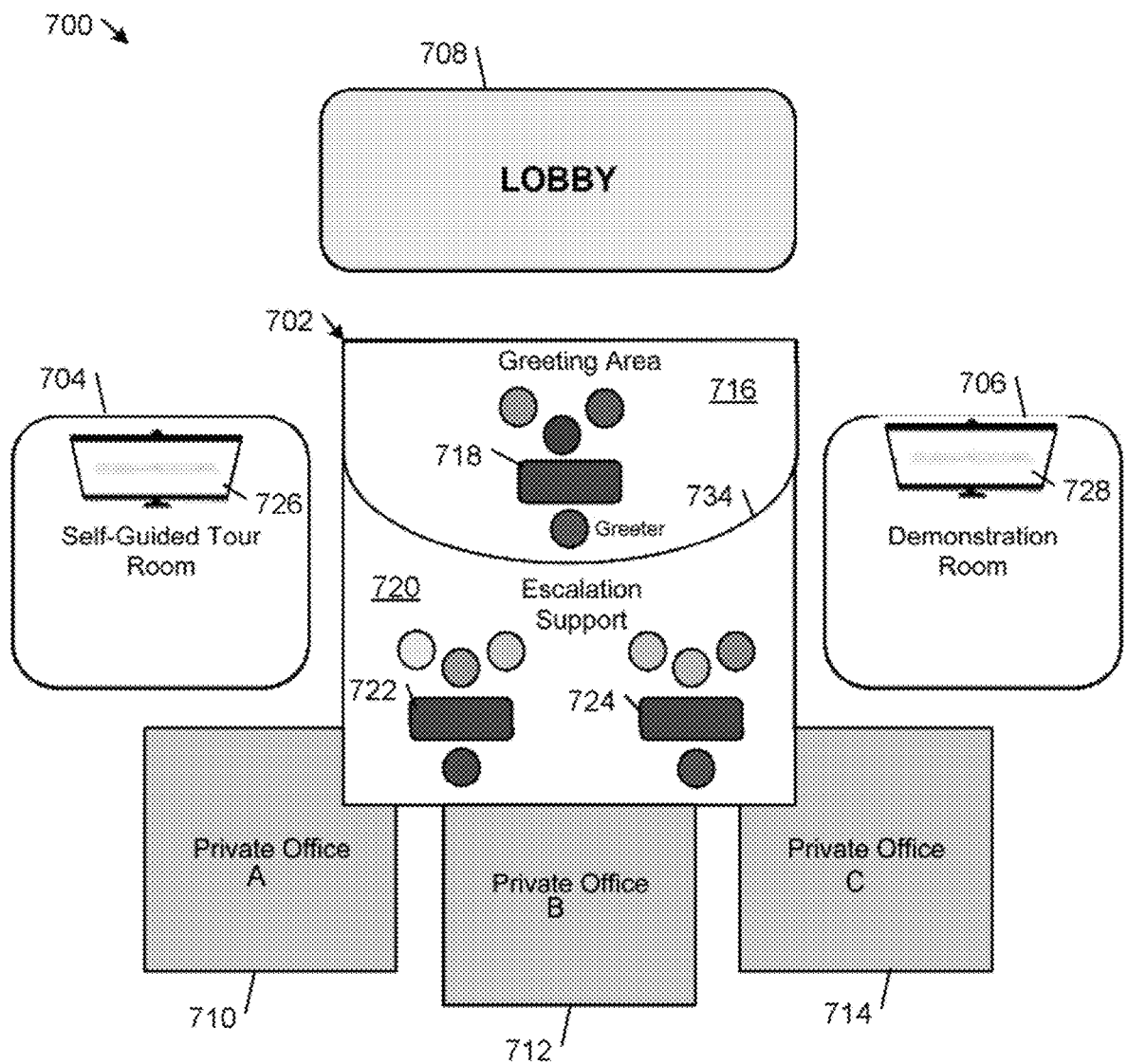
FIG. 10A is a diagrammatic view of an example of a virtual area.

FIG. 10A shows an example of a virtual area 700 that includes zones and is associated with a visualization of a support center. The virtual area 700 includes a help desk zone 702, a self-guided tour room 704, a demonstration room 706, a lobby 708, and three private offices 710, 712, 714. The help desk zone 702 includes a greeting area 716 that includes a table object 718, and an escalation support area 720 that includes two table objects 722, 724. Each of the self-guided tour room 704 and the demonstration room 706 includes a respective viewscreen object 726, 728.

In some examples, the table object 718 in the greeting area 716 has at least one seat reserved for network nodes associated with a respect support room role attribute value (e.g., "greeter"). In some examples, each of the table objects 722, 724 has at least one seat reserved for network nodes associated with a respective support room role attribute value (e.g., "technical support specialist" or "account specialist").

In some examples, each of the viewscreen objects 726, 728 is associated with a respective uniform resource identifier (URI) value identifying a respective network resource for providing information to a network node in association with the viewscreen object. For example, the viewscreen object 726 in the self-guided tour room 704 may be associated with a URL (uniform resource locator) value for a video or interactive web service showing the features of a product or service. The viewscreen object 728 in the demonstration room 706 may be associated with a URL value for a video or interactive web service demonstrating how to use a product or service. Based on a request received in connection with either of the viewscreen objects 726, 728 from a requesting one of the network nodes, the area service administers a connection between the network resource identified by the associated URI and the requesting network node. In some examples, network resources are associated with the viewscreen objects 726, 728 and shared with other network nodes in the same room as described in U.S. Provisional Patent Application No. 61/444,989, filed Feb. 21, 2011.

FIG. 10B shows an example of a zone map 730 that defines how data streams are sourced and sunk in the virtual area 700. The zone map 730 includes a respective governance zone (GZ) for each of the location zones: GZ2 corresponds to the greeting area 716; GZ3 corresponds to the escalation support area 720; GZ4 corresponds to the self-guided tour room 704; GZ5 corresponds to the demonstration room 706, GZ6 corresponds to the lobby 708; GZ7 corresponds to the private office 710; GZ8 corresponds to the private office 712; and GZ9 corresponds to the private office 714. The zone map 730 also includes a help desk wide zone 732 (GZ1).

There are seven control channels for audio: AudioChan1, AudioChan2, AudioChan3, AudioChan4, AudioChan5, AudioChan6, and AudioChan7.

Audio and chat data streams sourced from any of the greeting area (GZ2) and the escalation area (GZ3) respectively are published on the audio control channel AudioChan1 and the chat control channel ChatChan1, which are published by area/zone managers for the help desk wide governance zone 732 (GZ1). As a result, all communicants in the help desk zone 702 can subscribe to AudioChan1 and/or ChatChan1 and thereby receive the audio and/or chat data streams sourced from any of the greeting area 716 and the escalation support area 720. In the example shown in FIG. 10A, the demarcation 734 between the greeting area 716 and the escalation support area 720 is non-functional. In other examples, the demarcation 734 corresponds to either a curtain object or a door object as described above in connection with FIGS. 8A and 8B.

Audio and chat data streams sourced from the self-guided tour room (GZ4) respectively are published on AudioChan2 and ChatChan2, which are published by area/zone managers for the self-guided tour room so that network nodes in the self-guided tour room can communicate with each other via audio and/or chat. Audio and chat data streams sourced from the demonstration room (GZ5) respectively are published on AudioChan3 and ChatChan3, which are published by area/zone managers for the demonstration room so that network nodes in the demonstration room can communicate with each other via audio and/or chat. Audio and chat data streams sourced from the lobby (GZ6) respectively are published on AudioChan4 and ChatChan4, which are published by an area/zone managers for the lobby so that network nodes in the lobby can communicate with each other via audio and/or chat. Audio and chat data streams sourced from the private office A (GZ7) respectively are published on AudioChan5 and ChatChan5, which are published by an area/zone manager for the private office A so that network nodes in the Private office A can communicate with each other via audio and/or chat. Audio and chat data streams sourced from the private office B (GZ8) respectively are published on AudioChan6 and ChatChan6, which are published by area/zone managers for the private office B so that network nodes in the Private office B can communicate with each other via audio and/or chat. Audio and chat data streams sourced from the private office C (GZ9) are respectively published on AudioChan7 and ChatChan7, which are published by area/zone managers for the private office C so that network nodes in the Private office C can communicate with each other via audio and/or chat.

Application sharing data streams sourced from the self-guided tour room (GZ4) are published on ScreenChan1, which is published by an area/zone manager for the self-guided tour room so that network nodes in the self-guided tour room can share data received from the network resource associated with the viewscreen object 726. Application sharing data streams sourced from the demonstration room (GZ5) are published on ScreenChan2, which is published by an area/zone manager for the demonstration room so that network nodes in the demonstration room can share data received from the network resource associated with the viewscreen object 726.

Figure 11:
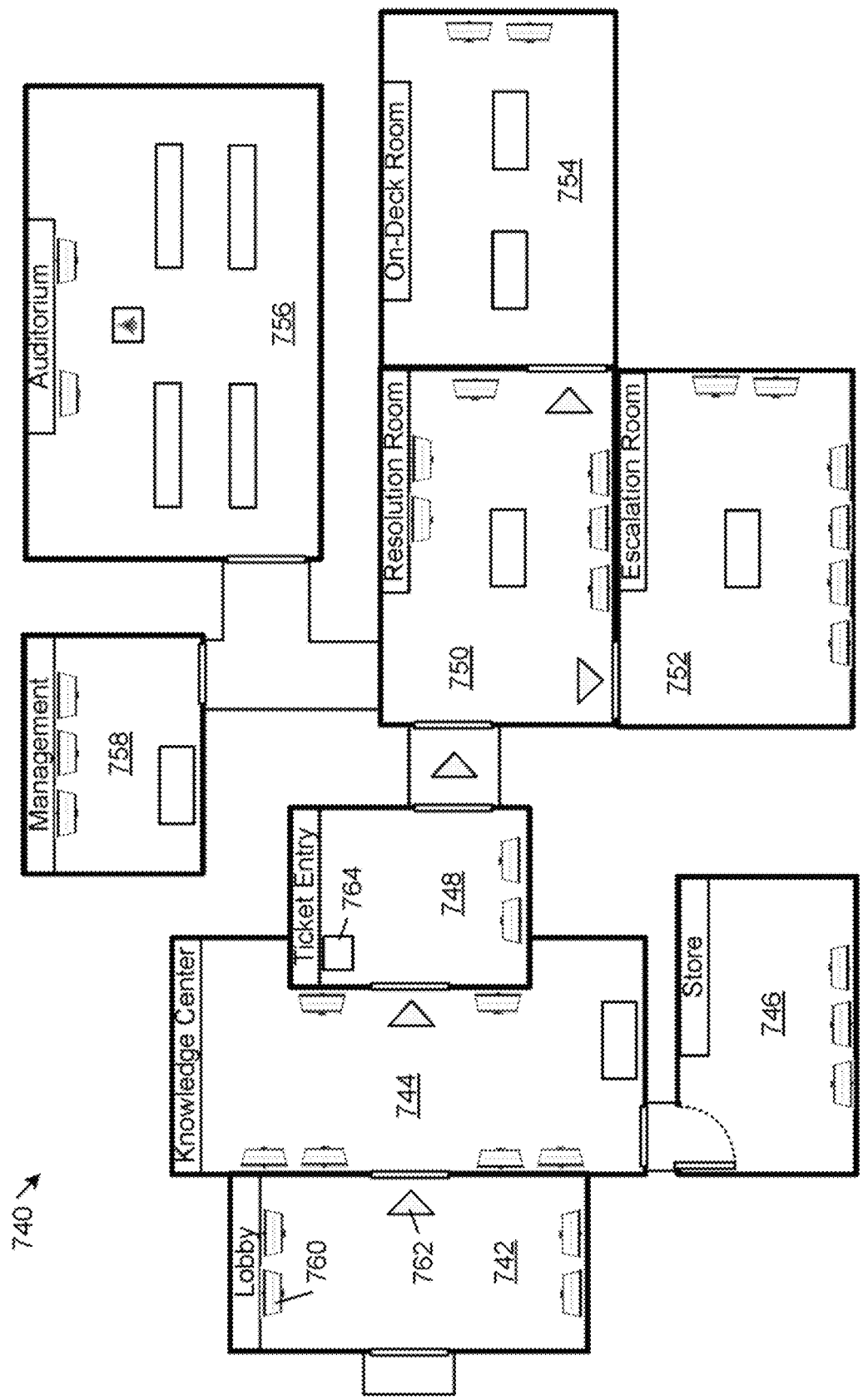
FIG. 11 is a diagrammatic view of an example of a virtual area.

FIG. 11 shows an example of a virtual area 740 for a Center of Excellence (COE) through which its members provide leadership, best practices, support, and/or training for a focus area. In some examples, the COE virtual area 740 serves as an integration competency center within an organization (e.g., a company) to provide expertise, knowledge or capability services to other members of the organization. The members of the integration competency center typically include people with special skills (e.g., expertise with an Enterprise Application, such as the SAP Enterprise Resource Planning (ERP) application available from SAP AG, Walldorf, Germany). The COE virtual area 740 provides a centralized communication environment in which such service personnel can provide services in separate functional areas while enabling them to work together to support the other members of the organization.

The COE virtual area 740 includes a lobby 742 (or port of entry), a knowledge center 744, a store 746, a ticket entry room 748, a resolution room 750, an escalation room 752, an on-deck room 754, an auditorium 756, and a management office 758. Arrows 762 are used to guide customers through the main process flow. Each of the rooms 742-758 of the COE virtual area 740 typically supports one or more modes of realtime communication (e.g., audio, chat, and application and network resource sharing) between the network nodes in the same room.

The lobby 742 includes several viewscreen objects 760 that typically are linked to network resources that provide various information for familiarizing incoming organization members (referred to herein as "customers") with the COE and the services provided by its members, including navigation aids, procedures, and rules.

After reviewing the information associated with the lobby 742, a customer typically enters the knowledge center 744, which provides a number of self-help resources that might enable the customer to resolve an issue without requiring the assistance of a member of the COE. For example, the knowledge center 744 typically includes one or more viewscreen objects that are linked to respective self-help resources (e.g., specific self-help content, such as user guides, FAQs, and resources for submitting queries to and receiving query responses from a knowledgebase).

If a customer cannot resolve the issue using the self-help resources associated with the knowledge center 744, the customer may enter the ticket entry room 748, which provides access to an issue tracking system that manages and maintains lists of issues. The ticket entry room 748 typically includes a viewscreen object that is linked to the issue tracking system. The customer can select the viewscreen object to interact with the issue tracking system. The customer may request a new ticket or enter the identifier of a ticket that already has been issued to the customer. In response, the issue tracking system may create or update reported customer issues, and update the issue tracking database accordingly. The ticket is used to track the issue, and potentially to schedule support for the customer's issue. The ticket entry room 748 also includes a table object 764 that allows the customer to upload a document (e.g., an incident report) or download a document that is stored in association with the ticket entry room 748.

After the ticket entry room 748, the customer may be invited to enter (or pulled into) the resolution room 748. The resolution room 750 typically includes a customer service person who designated for providing first tier support and is available to discuss the ticket with the customer (e.g., using audio, video, and/or chat). The customer service person may be able to resolve the issue or escalate the customer to an expert for assistance. If escalated and the expert is available to see the customer immediately, the customer service person may send the customer directly to the escalation room 752; otherwise, the customer service person may send the customer to the on-deck room 754, where the customer can wait until the expert is available.

The auditorium 756 may be used to provide scheduled training events for members of the organization. The management room 758 provides a virtual office for COE management personnel.

In some examples, in an effort to encourage the efficient use of COE services, one or more of the COE services can only be accessed by customers who have a sufficient number of COE credits, which may be issued to members of the organization on a periodic or other basis. For example, the first tier service provided in the resolution room 750 may cost a certain number of COE credits, and the escalation support provided by the experts in the escalation room may cost a greater number of COE credits. Without a sufficient number of credits, a customer would be limited to the self-help support provided in the knowledge center 744 until he or she was able to accumulate the required number of credits. In some examples, member of the organization are able to earn COE credits by helping other members to resolve their COE issues. For example, a member may earn credits by helping another member to resolve an issue through direct communications with the other member or by posting an answer to a resolved issue in a FAQ that is available to other members through the knowledge center 744.

Figure 12A:
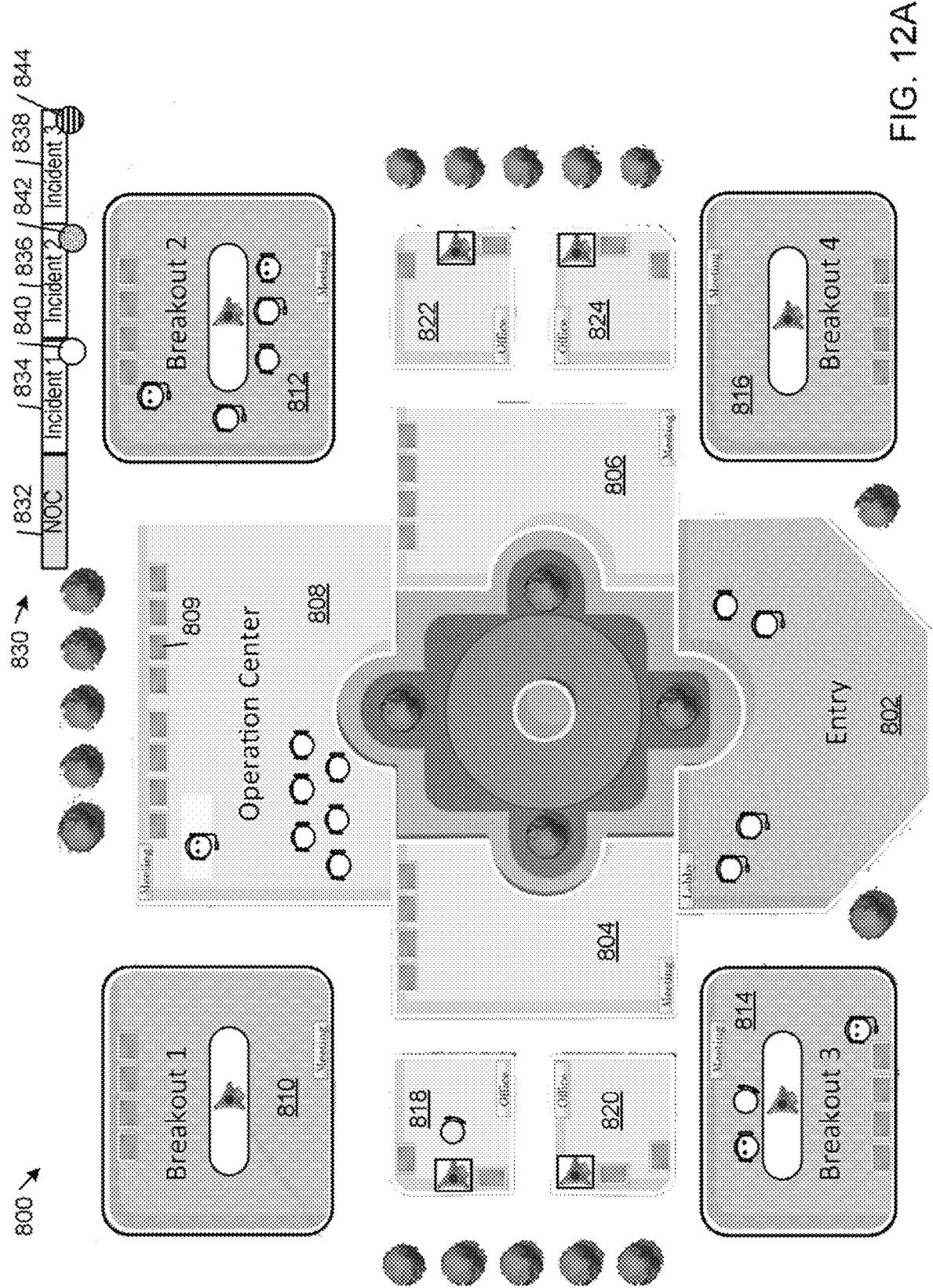
FIG. 12A is a diagrammatic view of an example of a virtual area.

FIG. 12A shows and example of a virtual area 800 that includes zones and is associated with a visualization of a network operations center (NOC). The virtual area 800 includes an entry zone 802, two meeting rooms 804, 806, an operation center 808, four breakout rooms 810, 812, 814, 816, and four offices 818, 820, 822, 824. In some examples, the entry area 802 support realtime audio and chat communications between the network nodes in the entry area 802. Each of the meeting rooms 804, 806 and the operations center 808 includes respective viewscreen objects 809 and supports realtime audio, chat, and application and network resource sharing communications between the network nodes in the same meeting room. Each of the breakout rooms 810-816 and the offices 818-825 includes respective viewscreen objects and a respective telephony object and supports realtime audio, chat, and application and network resource sharing communications between the network nodes in the same room. Each of the telephony objects supports shared dial-in and dial-out telephony communications as described in U.S. patent application Ser. No. 13/165,729, filed Jun. 21, 2011.

In some examples, the virtual area 800 includes a public announcement (PA) zone that is associated with a governance zone that publishes audio on a public announcement channel (e.g., PubAnnouceChan). In these examples, an area/zone manager for an area wide governance zone publishes the audio on public announcement channel to all of the zones in the area so that all network nodes in the virtual area 800 that have their audio sinks turned on are subscribed to the public announcement channel.

The network operations center 800 also includes a navigation bar 830 that includes links to other virtual areas for responding to incidents associated with the network operations center. In the example shown in FIG. 12A, the navigation bar includes a link 832 to the network operations center 800 and links 834, 836, 838 to respective virtual areas for handling three respective incidents (i.e., Incident 1, Incident 2, and Incident 3). The link corresponding to the current virtual area typically is highlighted. For example, in the example shown in FIG. 12A, the NOC link 832 is highlighted to provide a visual indication that the virtual area currently being displayed is the network operations area 800.

Based on selection of a respective one of the links 832-844 received from a requesting network node, the area service navigates the requesting network node to the virtual area identified by the selected link conditioned on any constraints that may be associated with entering the virtual area. For example, based on selection of the incident 1 link 834 in the navigation bar 830, the area service may navigate the requesting network node to the incident 1 response virtual area 850 shown in FIG. 11B. The incident 1 virtual area 850 has the same design and functionality as the network operations center 800, except that the operations center 808 has been relabeled "Incident Response Room" and the breakout rooms 810-816 have been respectively relabeled "Network Ops," "OS Ops," "Info Sec Ops," and "App Ops."

Each of the incident response links 834, 836, 838 also is associated with a respective visual status indicator 840, 842, 844 corresponding to the current status of the associated incident. In some examples, each status indicator 840-844 include an indication of a severity level (e.g., low, medium, or high) associated with the respective incident, where the severity level may be indicated by a numeric or color code (e.g., green for low, yellow for medium, and red for high). The severity level may be set manually by a network operations manager or automatically by a network operations monitoring system. The area service typically sends to each of the network nodes in the network operations center 800 or any of the associated incident response virtual areas specifications of the virtual areas, locations of the objects in the zones of the virtual areas, and for each incident response virtual area a respective visual status indicator corresponding to the current status determined for the associated incident.

Figure 12B:
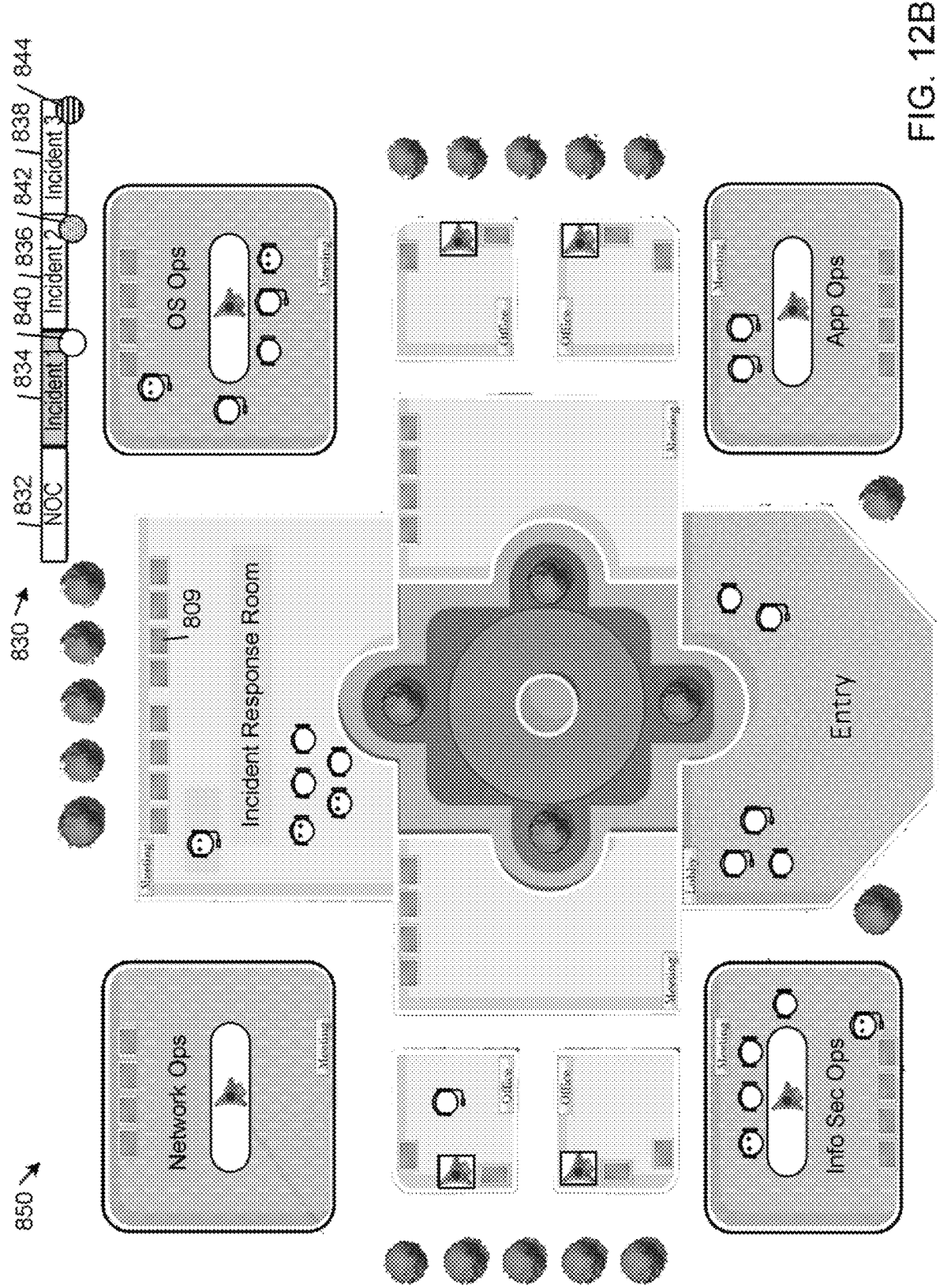
FIG. 12B is a diagrammatic view of an example of a virtual area associated with the virtual area of FIG. 12A.

The virtual area design of FIGS. 12A-12B logically partitions network operations by function (e.g., management versus operations) and by incident. Each virtual area and/or zone within the virtual area can be associated with the people (e.g., through area membership or other capability requirements) and the network resources (through URIs linking the services to particular zones of the virtual area) that are needed to perform the functions assigned to the virtual area. This type of design provides an intuitive way to quickly navigate to target teams of people and resources and thereby improve operational and response efficiencies.

In some examples, one or more of the viewscreen objects 809 in the operations center 808 of the NOC area 800 (FIG. 12A) are linked (e.g., through respective URIs) to respective network resources that provide information feeds indicating various types of information that are relevant to the members of the network operations center (e.g., details of highly significant alarms, ongoing incidents, general network performance, current event information, such as news streams from a network news service or weather feeds from a network weather service). In some cases, information feeds may be obtained directly from network monitoring equipment that monitors the various devices and systems or from one or more network resources (e.g., a network operations server) that collect and interpret live information feeds obtained from network monitoring equipment. Each communicant in the Operations Center 808 may subscribe to the information feeds by selecting the respective viewscreen objects 809 that are linked to the respective network resources.

In some examples, one or more of the viewscreen objects 809 in the Incident Response Room of the virtual area 850 (FIG. 12B) are linked to respective network resources that provide incident-specific information (e.g., an indication of the status of the incident, a list of the process steps for resolving the given incident, and a list of the personnel current assigned to work on each of the process steps). This information typically is provided by a network operations service that streams data and updates to the viewscreen objects 809, which are linked to the viewscreen objects through respective URIs. Each communicant in the Incident Response Room may subscribe to the information streams by selecting the respective viewscreen object 809.

In some examples, a virtual area or a set of related virtual areas are designed to provide a structured communication flow, where collaborative communications that support different stages or tasks of a process (e.g., a business process) are allocated to respective zones that are arranged spatially according to a visual representation of a workflow for the process. By these designs, the people (e.g., through zone membership or other capability requirements) and the network resources (through URI's linking the services to particular zones of the virtual area) can be partitioned logically by process stage or task. In addition, process managers and other communicants readily can determine the current development stage of a process based on the current realtime activity levels in the zones and the information linked with each zone (e.g., chat histories, recorded audio sessions, stored files, and network resources linked to the zone).

In some examples, a virtual area includes zones that are arranged in a spatial layout according to a directed graph of tasks defining a workflow, where the zones are associated with respective sets of one or more of the tasks and arranged in the spatial layout in a sequence that tracks locations of the associated tasks in the directed graph. The zones of a virtual area may be arranged in a spatial layout according to a structured workflow of successive steps, where adjacent zones in the spatial layout are respectively designated for supporting realtime communications between ones of the network nodes present in the zones in connection with successive ones of the steps of the structured workflow. The spatial sequence of zones typically defines a path in the spatial layout. In some examples, the virtual area is associated with a visualization of the spatial layout that includes visual indications of the tasks respectively associated with the zones.

The area service may administer a resource associated with the set of one or more tasks respectively associated with a given zone. In some examples, the resource is a network service, which may be linked to the given zone by a prop (e.g., a viewscreen object associated with a URI) in the given zone. The area service typically administers connections between the network resource and respective ones of the network nodes in the given zone. In some examples, the resource is a set of communicants, which may be linked to the given zone through a membership list. The area service typically restricts access to the given zone to the communicants in the set. In some examples, at least two of the zones share the same resource. In these examples, the at least two zones typically are positioned adjacent one another in the spatial layout.

In some examples, the workflow includes a contingent task that is associated with a respective contingency. In these examples, the area service may dynamically create a new zone in the spatial layout based on occurrence of the contingency.

In some examples, a computer creates a workflow based virtual area as follows. Based on a directed graph of tasks defining a workflow, the computer associates sets of one or more tasks with respective zones of a virtual area. The computer determines a spatial layout of the zones in which the zones are arranged in a spatial sequence that tracks locations of the associated tasks in the directed graph. The computer associates one or more switching rules with respective ones of the zones of the virtual area. Each of the switching rules defines a respective connection between sources of a respective real-time data stream type and sinks of the real-time data stream type in terms of positions in the virtual area. The computer stores a specification of the virtual area that includes definitions of the spatial layout of the zones and the one or more switching rules.

Figure 13:
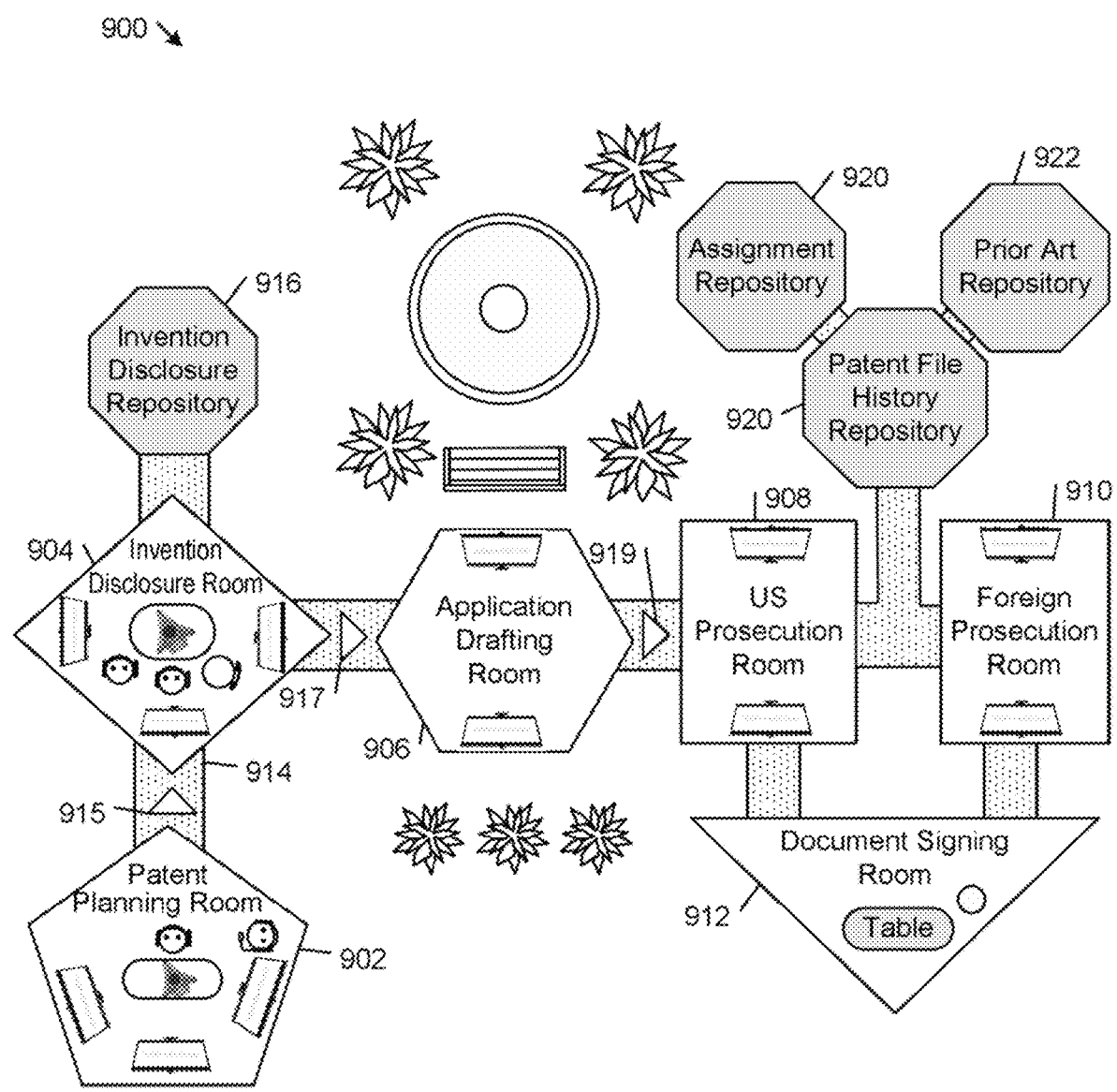
FIG. 13 is a diagrammatic view of an example of a virtual area.

FIG. 13 shows an example of a virtual area 900 that includes zones and is associated with a spatial visualization of a patent prosecution workflow. The virtual area 900 may be created for the prosecution of a single patent application or a set of related patent applications (e.g., the applications in a patent family, the applications owned by a common entity, or the applications prosecuted by a common entity). The virtual area includes a Patent Planning Room 902, an Invention Disclosure Room 904, an Application Drafting Room 906, a U.S. Prosecution Room 908, and a Foreign Prosecution Room 910, and a Document Signing Room 912. Each of the rooms 902-910 includes respective viewscreen objects and supports realtime audio, chat, and application and network resource sharing communications between the network nodes in the same meeting room. Each of Patent Planning Room 902 and the Invention Disclosure Room 904 additionally includes a respective telephony object that supports shared dial-in and dial-out telephony communications as described in U.S. patent application Ser. No. 13/165,729, filed Jun. 21, 2011.

The zones 902-912 of the virtual area 900 are arranged in a spatial layout according to a directed graph of tasks defining a patent prosecution workflow, where the zones are associated with respective sets of one or more of the tasks and arranged in the spatial layout in a sequence that tracks locations of the associated tasks in the directed graph. In particular, the zones 902-912 are arranged in a spatial layout according to successive steps of a patent prosecution process, from the initial planning stage, to the invention disclosure stage, to the application drafting stage, to the U.S. and foreign prosecution stages, which are supported by the document signing task. Thus, the adjacent zones in the spatial layout are respectively designated for supporting realtime communications between ones of the network nodes present in the zones in connection with successive ones of the steps of the structured workflow. The spatial sequence of zones 902-912 defines a path in the spatial layout, where the path metaphor is reinforced by the depiction of a virtual path 914 that connects the zones and arrows 915, 917, 919 demarcating the direction of the main process flow. The visualization of the spatial layout also includes visual indications (e.g., room labels) of the tasks respectively associated with the zones.

The virtual area 900 also includes a number of support zones for storing task-specific documents, recordings, and other data. In particular, the virtual area includes an Invention Disclosure Repository 916 for storing invention disclosure information, a Patent File History Repository 918 for storing file history information, an Assignment Repository 920 for storing patent assignment documents, and a Prior Art Repository 922 for storing prior art documents. Each of the support zones 916-922 typically are associated with file uploading, sharing, and retrieving functionality as described in U.S. patent application Ser. No. 12/354,709, filed Jan. 15, 2009, and Ser. No. 12/418,243, filed Apr. 3, 2009.

In some examples, a workflow process (e.g., a workflow process of an enterprise application) involves processing a case (i.e., a workflow instance; also referred to as an order or work unit) through a sequence of tasks (or functions) according to a set of predefined rules. For example, an order fulfillment workflow process may include the component processes "charge customer," "pack order," and "ship order." When a case is created, a workflow engine manages each component. The workflow process may be defined in terms of the activities (or functions) that must be completed or in terms of the states that a document or other entity must go through in order to be completed. In some examples, cases flow through workflow steps that are represented by respective zones of a virtual area, which spatially compartmentalize the workflow process steps to enable users to readily visualize the cases that currently are being worked in the corresponding workflow steps, who is working on those cases, and how long each case has been in each step and assigned that to a particular team or person.

Figure 14A:
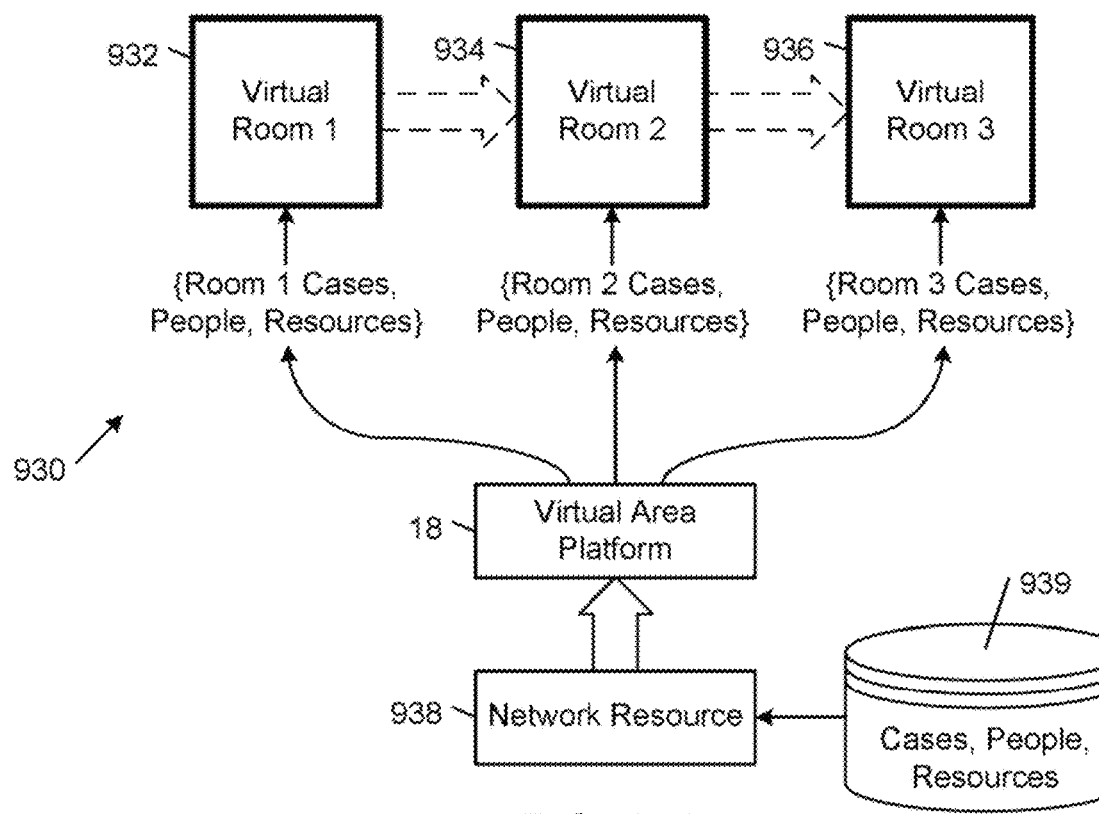
FIG. 14A is a diagrammatic view of an example of a presentation of workflow process information logically partitioned into a spatial arrangement of zones of a virtual area.

FIG. 14A shows an example of a virtual area 930 that models an example of a workflow process. The virtual area 930 includes zones 932, 934, 936 that correspond to respective ones of the constituent tasks of the workflow process and are arranged in a spatial layout according to a directed graph of tasks defining the workflow process. Each of the zones 932-936 typically is associated with a label that typically describes the respective workflow process activity or function that is performed in the zone. In this example, each of the zones 932-936 is associated with a respective set of cases that currently are being processed by the tasks assigned to the zone, a respective set of people that are assigned to perform the tasks assigned to the zone, and a respective set of resources that are needed to perform the tasks assigned to the zone. In the example shown in FIG. 14A, a network resource 938 (e.g., a workflow system, such as the SAP AP Enterprise Resource Planning (ERP) application available from SAP AG, Walldorf, Germany) manages the workflow process and tracks the cases, people, and resources involved in the workflow process and stores this information in a database 939. The virtual area platform 18 logically partitions the workflow process information according to the spatial layout of zones to provide an intuitive compartmentalization of the information that is relevant for each of the constituent workflow tasks that allows communicants to readily navigate to the information that they need to quickly understand the current state of the workflow system as a whole and the current state of individual cases that are being processed by the workflow system. In some examples, the network resource 938 manages a directory that authorizes individuals to participate in each workflow step, and the virtual area platform 18 maps the authorization information in the directory to membership attributes of the communicants in the organization.

Figure 14B:
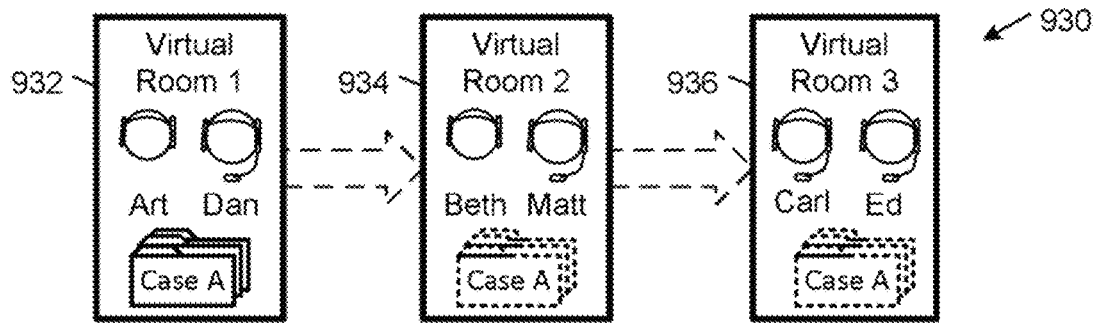
FIG. 14B is a diagrammatic view of an example of a workflow process in which people are assigned to respective zones of a virtual area where they perform different respective functions on cases being processed through the workflow process.

FIG. 14B shows of an example of the workflow process modeled by the virtual area 932 shown in FIG. 14A in which people are assigned to respective zones of the virtual area where they perform different respective functions on cases being processed through the workflow process.

Figure 15:
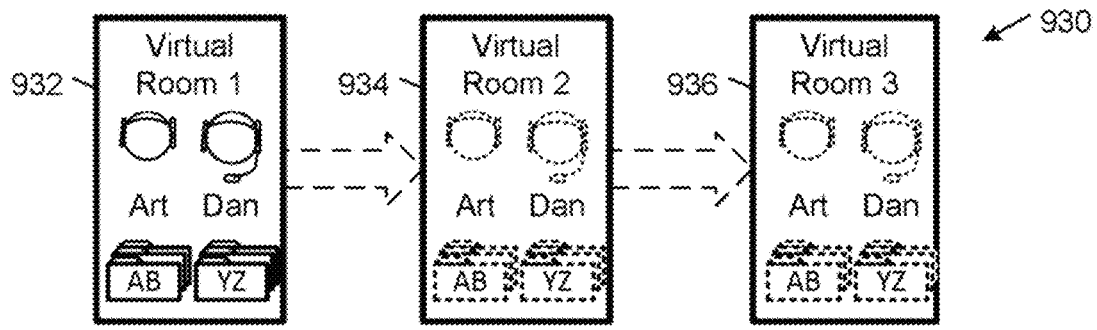
FIG. 15 is a diagrammatic view of an example of a workflow process in which people as assigned to particular cases and move sequentially through the zones of a virtual area as the cases are processed through the workflow process.

FIG. 15 shows an example of a different workflow process in which people as assigned to particular cases and move sequentially through the zones 932-936 of the virtual area 930 as the cases are processed through the workflow process. In this example, the network resource 938 tracks the current functions being performed by the people on their respective cases and the virtual area platform maps that information to the respective zones 932-936 of the virtual area 930.

Figure 16:
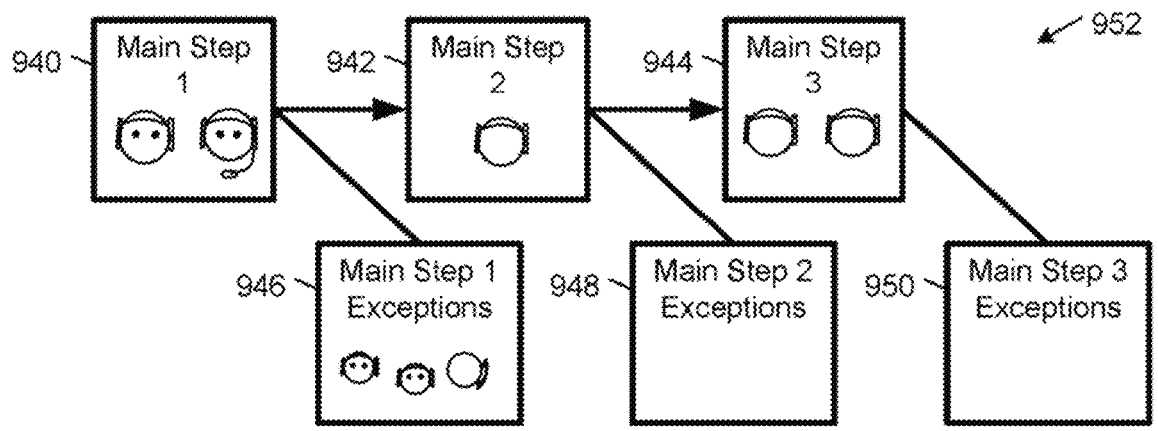
FIG. 16 is a diagrammatic view of an example of a spatial arrangement of zones of a virtual area.

FIG. 16 shows an example of a spatial arrangement of zones 940, 942, 944, 946, 948, 950 of a virtual area 952. In this example, the zones 940-944 correspond to the main steps in a workflow process, and the zones 946-950 correspond to exception handling processes that respectively are associated with the main steps in the workflow process. For example, the zones 940-944 may correspond to a charge customer function, a pack order function, and a ship order function of an order fulfillment workflow process, respectively, and the zones 946-950 may correspond to the exception handling functions respectively associated with the charge customer function, the pack order function, and the ship order function. Standard cases move through the zones assigned to the main workflow steps, whereas non-standard cases are pushed out of the main process flow to respective ones of the exception zones (e.g., "review rooms") where, for example, credentialed managers may review the cases and communicate about them to determine how to resolve their issues and get them back into the main process flow.

Some exemplary virtual area include one or more zones designated for special purpose workflow steps that involve collaborating with third party communicants who are not members of the organization that owns the cases being processed through the workflow. In one example, a virtual area includes zones that are assigned to the steps in the main process flow of a supply chain workflow, and a special-purpose vendor zone in which designated members of the organization and designated members of one or more key vendors are able to collaborate on particular tasks assigned to the zone.

In some examples, the rules of a workflow management application affect one or more of the capabilities, rules, and design of the virtual area. For example, membership changes in the workflow management application results in changes in the capabilities of the people tied to the workflow process function assigned to one or more zones of the virtual area modeling that workflow process. In some cases, a change in a step of a particular workflow process function, results in a change in the objects in the zone assigned to that function. For example, in some cases, a particular workflow process task or function is assigned to a particular zone and includes one or more steps each of which is associated with a respective viewscreen object in the zone that is linked to respective network resource (e.g., a data field or a document); in this example, a change in the number of steps in the particular workflow process function would result in a change in the number of viewscreen objects in the particular zone. In some examples, the rules of a workflow management application cause the virtual area platform to dynamically create a new zone when one or more conditions are satisfied. For example, in some cases, a workflow management application may require the creation of a new special purpose meeting zone when a particular exception in the workflow process occurs.

In some examples, an application of the virtual area platform retrieves from the network resource 938 contact information for the people assigned to a zone and/or the people assigned to a case being processed in a zone, and associates that contact information with "get" functionality associated with the zone so that communicants in the zone readily can bring the relevant people into the zone to discuss information associated with the zone and/or a particular case being processed in the zone. For example, before moving a particular case from a main workflow process step to the associated exception handling zone, a communicant may use the get functionality to invite the relevant people (e.g., other people assigned to the particular zone or a manger responsible for the entire workflow process) into the zone to discuss the case and potentially resolve any issues that might require the case to be processed as an exception. In some examples, when a case is pushed out of the main workflow process zone to an exception zone, one or more alerts are sent to notify one or more designated communicants (e.g., team members or managers) that a case needs resolution. The alerts may include requests inviting the designated communicants to enter the exception zone into which the particular case has been pushed. In some of these examples, the workflow process application as applies rules for determining whether or not a particular exception can be handled with an immediate or regularly scheduled meeting.

In some examples, one or more viewscreen objects in each of the zones 932-936 are associated with respective links (e.g., URIs) to the information that is relevant to the zone. For example, one or more viewscreen objects in each zone may be linked to respective web pages that show one or more of the cases that currently are being processed in the zone, who is working on those cases or a responsible for resolving any exceptions associated with a case, and metrics (e.g., scores or statistical information, such as the age of a case or how quickly an exception was resolved) for evaluating those cases. In some cases, a viewscreen object in a zone may be associated with a link to a link to a task list application that shows a prioritized list of action items to be performed in the zone (e.g., the next steps to be performed the process of resolving a case that currently is in an exception zone). These web pages may be generated by the network resource 938 or by an application of the virtual area platform 18 that retrieves the relevant information from the network resource 938.

Figure 17:
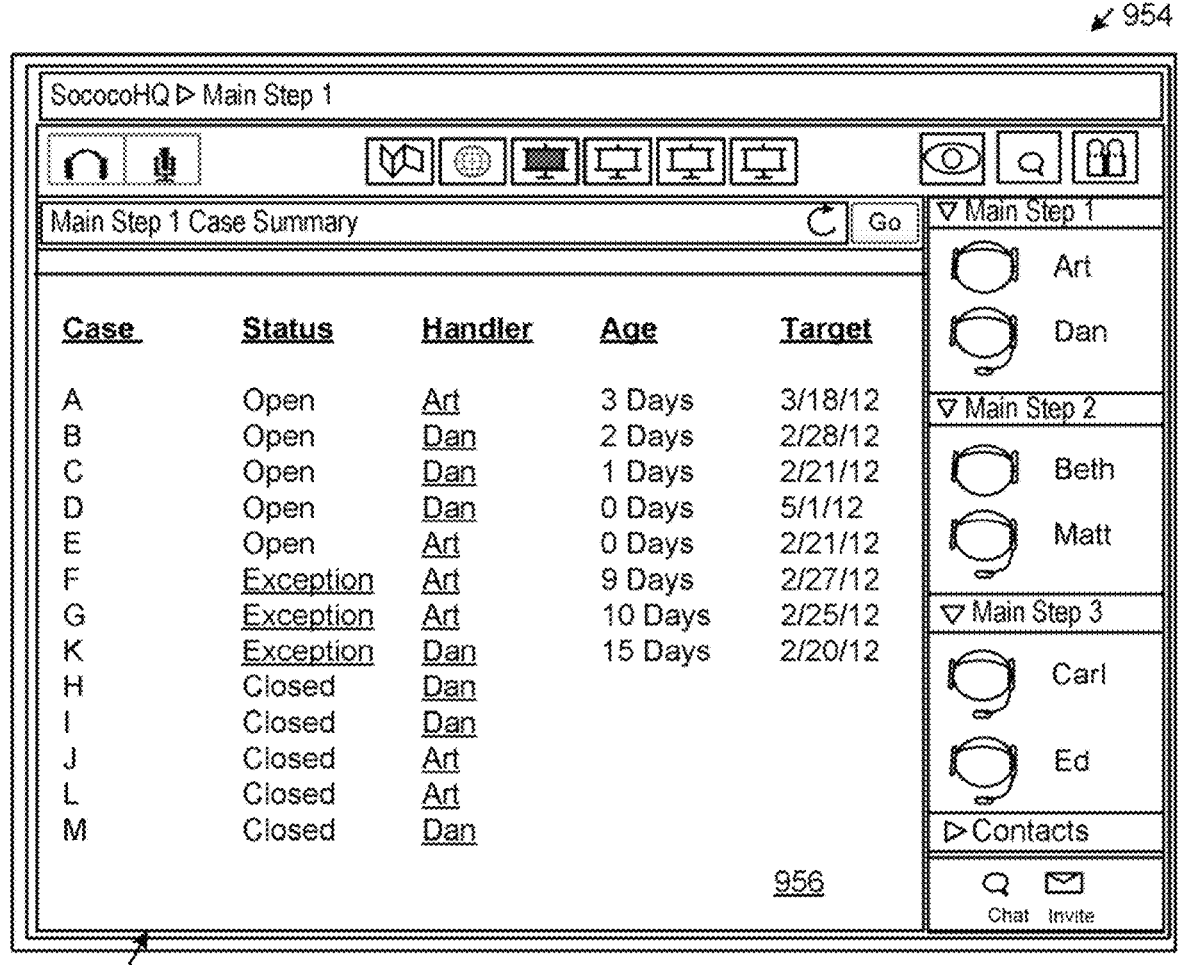
FIGS. 17-19 are diagrammatic views of examples of different graphical user interfaces.

FIG. 17 shows an example 954 of the client graphical user interface 270 (see, e.g., FIGS. 4 and 5) in which case summary information 956 associated with Meeting Step 1 is presented in the viewer panel 958. The case summary information includes a Case identifier, the Status of the case, the person or persons assigned to handle the case, the Age of the case, and the Target completion date for the case.

Figure 18:
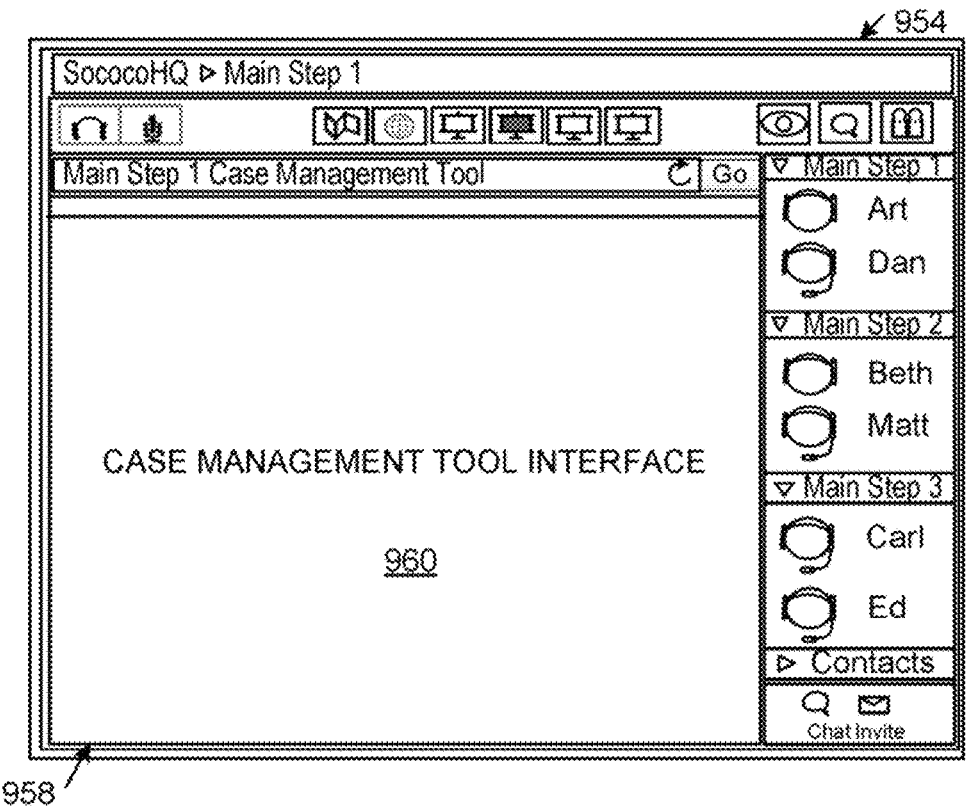
Figure 19:
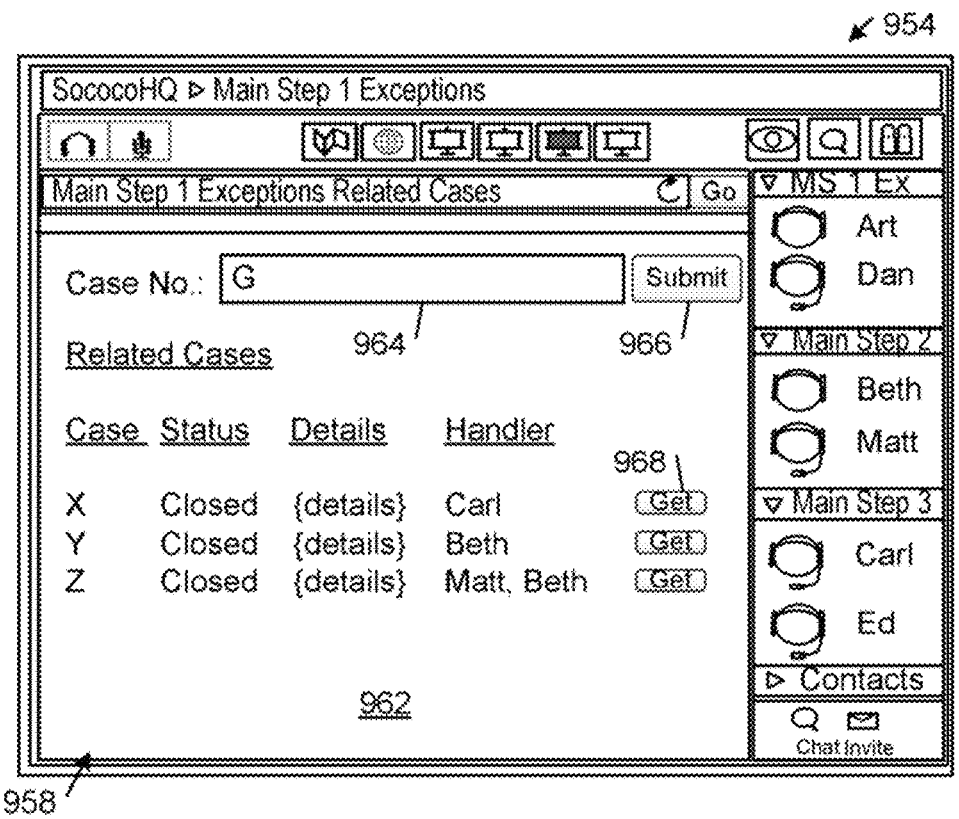

FIG. 18 shows the client graphical user interface 954 in which an interface 960 of a case management tool that is associated with Meeting Step 1 is presented in the viewer panel 958. The interface 960 may correspond to a web page interface that is generated and populated with information by the network resource 938.

In some examples, one or more objects (e.g., a viewscreen object for displaying information, or a table object for retrieving files) in the zones of a virtual area are associated with respective links that include queries on the database 939 that is maintained by the network resource 939. For example, in a zone (e.g., the procurement room) designated for performing a procurement function of a workflow process, a view screen object in a procurement room may be associated with a link that includes a query for all active cases that are assigned to members of the procurement room. In some of these examples, based on selection of a graphical representation of the viewscreen object (or a graphical representation of the link) presented in a graphical user interface of the client communications application 26, 32, the browser component on the client network node 12, 14 transmits the query to the network resource 938. The network resource 938 queries the database 939 and returns the query results to the browser component. The browser component renders the results in the graphical user interface presented on the client network node 12, 14.

In addition to associating zones with specific queries on the network resource database 939, some examples allow queries to be submitted to the network resource. The queries may be submitted in response to an explicit request received from a communicant (e.g., selection of a query submission button) or automatically in response to an event (e.g., entry of a communicant into a zone of a virtual area triggers the virtual area platform 18 to submit a query for all the cases currently being handled by the communicant in zone). In some examples, the queries may be general queries (e.g., all cases handled by Art within the last year that have involved exceptions) or specific types of queries (e.g., all currently active cases being processed in Main Step 1 Room).

FIG. 18 shows the client graphical user interface 954 in which a related case query interface 962 is associated with a viewscreen object in the Main Step 1 Exceptions room 946. The case query interface 962 includes a text box 964 for entering a case identifier (e.g., "G") and a submit button 966 for submitting the case identifier to the network resource. The case query interface 962 may be a web page that is generated by a case management tool of the network resource 938 or an application of the virtual area platform 18 that interfaces with the network resource 938. Based on selection of the submit button 966, the client network node submits the case identifier to the network resource 18, which queries the database 939 and returns the query results to the client network node (e.g., either by populating the query interface 962 directly or by transmitting the information to the virtual area platform application, which populates the query interface 962). The query results are presented in a Related Cases section of the query interface 962. The Related Cases section lists all the cases that are related to the submitted case identifier and shows the statuses of those cases, details of those cases (e.g., summary information, such as age and whether the case involved any exceptions and, if so, whether or not the exceptions were resolved), and the person who handled those cases. For each of the listed related cases, the Related Cases sections includes a respective Get button 968 that allows the communicant to invite the persons associated with the respective case (e.g., the person who handled the case, and perhaps the manager assigned to the case) to enter the current zone (i.e., the Main Step 1 Exceptions room 946) to the discuss the related case and the case currently being processed. Based on selection of the Get button 968, the virtual area platform 18 transmits a respective invitation to each of the communicants associated with the case. Each invitation typically identifies the person who submitted the invitation, the room to which the invitees are invited, and other contextual information associated with the invitation (e.g., "Carl: Please join Art and Dan in the Main Step 1 Exceptions room to discuss Cases X and G").

In some examples, case queries on the network resource database 393 are combined with queries on the relationship database 47 (see, e.g., FIG. 1) to obtain a rich set of contextual case information. In some examples, the virtual area platform 18 may provide a summary of a meeting that occurred in a particular zone in connection with a particular case or multiple cases. For example, the virtual area platform 18 may provide a list of the people who were present during the meeting, text chat generated in the meeting, links to the files shared in the meeting, links to recordings (e.g., audio or video recordings) captured during the meeting, and links to notes and other information generated in the meeting. The virtual area platform 18 may retrieve information from the relationship database 47 based on, for example, one or more of case, time, zone, and communicant information. The case information may be used to determine time information, such as, the times when a particular case was processed through one or more steps of a workflow process (this information typically is stored by the network resource in the database 939 in association with the case identifier). The case information also may be used to determine zone information, such as the zones associated with one or more of the steps through which the case was processed (this information may be obtained by the virtual area platform 18 by an explicit mapping between the steps of a workflow process and the zones of a virtual area). The communicant information includes, for example, the people who are/were assigned to handle the case, or are/were managing the case (this information typically is stored by the network resource 938 in the database 939 in association with the case identifier). Examples of the types of queries that can be made on the relationship database 47 include:

using time and zone information to retrieve case and/or interaction record information relating to particular times in a particular zone (e.g., a list of all the cases that were worked on in a particular zone during a particular period);

using time and communicant information to retrieve case and/or interaction record information relating to particular times when a particular communicant was present in the virtual area (i.e., a list of all cases that a particular communicant worked on during a particular period);

using zone and people information to retrieve case and/or interaction record information relating to a particular communicant in a particular zone (e.g., a list of all cases that a particular person worked on in a particular zone); and using time, zone, and people information to retrieve interaction record information relating to particular times when a particular communicant was working in a particular zone (e.g., a list of all cases that a particular person worked on in a particular zone during a particular time).

A wide variety of other queries are possible.

The search results may be presented by the client communicants applications in association with links to content (e.g., text chat histories, audio and video recordings, shared files, and other data) and controls for interacting with communicants (e.g., Get buttons for inviting communicants to a particular zone, Chat buttons for initiating a text chat communication with one or more communicants, and a Microblogging button for broadcasting a text communication to subscribers of a particular microblogging account).

III. Conclusion

Other embodiments are within the scope of the claims.

The invention claimed is:

1. A method performed by one or more processors executing one or more program instructions encoded in one or more non-transitory structures, the method comprising:
partitioning a virtual area to allocate respective zones in the virtual area to model a workflow of a business process;
arranging the zones spatially according to a visual representation of the workflow of the business process to create a spatial visualization of the workflow;
establishing at least one respective presence in the respective zones in the virtual area for each of one or more communicants, wherein copresent communicants are able to interact with one another in a context of the workflow of the business process defined by the spatial visualization of each of the zones of the virtual area using respective network nodes;
in the spatial visualization of the virtual area, providing tools for communicants who are present in the virtual area to perform a predefined set of tasks associated with the business process according to a set of predefined rules;
modifying one or more attributes of the virtual area based on changes in the business process;
monitoring data relating to the tasks performed for an instance of the business process and relating to communicant interactions in the virtual area to determine a business process development stage of the business process based on the activity levels in the zones and information linked with each zone; and
based on the monitored data, generating one or more metrics for evaluating performance of the one or more instances of the business process.

2. The method of claim 1, wherein the tasks in the predefined set are grouped into respective subsets of one or more of the tasks; wherein the spatial visualization of the virtual area comprises a respective spatial zone for each subset of one or more tasks.

3. The method of claim 1, further comprising identifying an event based on application of one or more predefined rules to the monitored data;
responding to the identified event by modifying one or more attributes of the virtual area.

4. The method of claim 1, wherein the modifying comprises modifying the number of tools provided based on a change in the number of tasks associated with the business process.

5. The method of claim 1, wherein the modifying comprises modifying a particular one of the tools provided in the virtual area based on a change to a particular one of the tasks associated with the business process.

6. The method of claim 1, wherein the modifying comprises modifying a capability of a particular one of the communicants to enter a particular location in the virtual area based on a revocation of the particular communicant's authorization to participate in performing one or more of the tasks associated with the business process.

7. The method of claim 1, wherein the modifying comprises dynamically creating a new location in the virtual area based on occurrence of an event relating to an instance of the business process.

8. The method of claim 7, wherein the new location in the virtual area is created dynamically based on occurrence of an exception in an instance of the business process.

9. The method of claim 1, wherein the tools comprises a tool for displaying information, and a tool for retrieving data files.

10. The method of claim 1, wherein the tools comprises a particular tool for submitting one or more queries to a database comprising the monitored data relating to the tasks performed for the business process instance.

11. The method of claim 10, wherein the particular tool is associated with a predetermined query on the database.

12. The method of claim 11, wherein the particular tool is located in a particular zone of the spatial visualization of the virtual area, and the query associated with the particular tool is triggered based on a communicant entering the particular zone.

13. The method of claim 1, wherein the monitored data comprises one or more of task status data, time data, virtual location data, and collaboration data.

14. The method of claim 1, wherein the monitored data comprises summaries of one or more meeting of communicants in the virtual area.

15. The method of claim 1, wherein the monitored data comprise respective times when one or more tasks of the business process instance were performed.

16. The method of claim 1, wherein the monitored data comprise locations in the virtual area associated with one or more of the tasks through which a business process instance was processed.

17. The method of claim 1, wherein the monitored data comprise names associated with the communicants who are assigned to perform the tasks associated with the business process.

18. The method of claim 1, further comprising interfacing a virtual area platform configured to administer the virtual area, with a workflow management system configured to administer the business process.

19. A system, comprising:
a virtual area platform comprising one or more processors executing one or more program instructions encoded in one or more non-transitory structures to administer a virtual area and perform operations comprising:
partitioning a virtual area to allocate respective zones in the virtual area to model a workflow of a business process;
arranging the zones spatially according to a visual representation of the workflow of the business process to create a spatial visualization of the workflow;
establishing at least one respective presence in the respective zones in the virtual area for each of one or more communicants, wherein copresent communicants are able to interact with one another in a context of the workflow of the business process defined by the spatial visualization of each of the zones of the virtual area using respective network nodes;
in the spatial visualization of the virtual area, providing tools for communicants who are present in the virtual area to perform a predefined set of tasks associated with the business process according to a set of predefined rules;

modifying one or more attributes of the virtual area based on changes in the business process; and a business process platform interfaced with the virtual area platform, and comprising one or more processors executing one or more program instructions encoded in one or more non-transitory structures to administer the business process and perform operations comprising:

monitoring data relating to the tasks performed for an instance of the business process and relating to communicant interactions in the virtual area to determine a business process development stage of the business process based on the activity levels in the zones and information linked with each zone; and based on the monitored data, generating one or more metrics for evaluating performance of the one or more instances of the business process.

20. At least one non-transitory computer storage medium encoded with a computer program product comprising instructions that, when executed by one or more systems comprising one or more computers, cause the one or more systems to perform operations comprising:

partitioning a virtual area to allocate respective zones in the virtual area to model a workflow of a business process;

arranging the zones spatially according to a visual representation of the workflow of the business process to create a spatial visualization of the workflow;

establishing at least one respective presence in the respective zones in the virtual area for each of one or more communicants, wherein copresent communicants are able to interact with one another in a context of the workflow of the business process defined by the spatial visualization of each of the zones of the virtual area using respective network nodes;

in the spatial visualization of the virtual area, providing tools for communicants who are present in the virtual area to perform a predefined set of tasks associated with the business process according to a set of predefined rules;

modifying one or more attributes of the virtual area based on changes in the business process;

monitoring data relating to the tasks performed for an instance of the business process and relating to communicant interactions in the virtual area to determine a business process development stage of the business process based on the activity levels in the zones and information linked with each zone; and based on the monitored data, generating one or more metrics for evaluating performance of the one or more instances of the business process.

* * * * *